United States Patent
Hu

(10) Patent No.: US 11,546,255 B2
(45) Date of Patent: Jan. 3, 2023

(54) PACKET PROCESSING METHOD, CONTROLLER, AND FORWARDING DEVICE

(71) Applicant: Huawei Technologies Co., Ltd., Shenzhen (CN)

(72) Inventor: Zhibo Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/012,982

(22) Filed: Sep. 4, 2020

(65) Prior Publication Data

US 2020/0403910 A1    Dec. 24, 2020

Related U.S. Application Data

(63) Continuation of application No. PCT/CN2019/077009, filed on Mar. 5, 2019.

(30) Foreign Application Priority Data

Mar. 7, 2018 (CN) .......................... 201810186956.3

(51) Int. Cl.
*H04L 45/302* (2022.01)
*H04L 45/16* (2022.01)
(Continued)

(52) U.S. Cl.
CPC ............ *H04L 45/304* (2013.01); *H04L 45/16* (2013.01); *H04L 45/38* (2013.01); *H04L 45/64* (2013.01); *H04L 45/745* (2013.01)

(58) Field of Classification Search
CPC ....... H04L 45/304; H04L 45/16; H04L 45/38; H04L 45/64; H04L 45/745
See application file for complete search history.

(56) References Cited

U.S. PATENT DOCUMENTS

| 2010/0205296 A1 | 8/2010 | Zhang et al. |
| 2012/0099591 A1 | 4/2012 | Kotha et al. |

(Continued)

FOREIGN PATENT DOCUMENTS

| CN | 101127713 A | 2/2008 |
| CN | 102025541 A | 4/2011 |

(Continued)

OTHER PUBLICATIONS

"OpenFlow Switch Specification," ONF TS-007, Version 1.3.1 (Wire Protocol 0x04), Sep. 6, 2012, 128 pages.

(Continued)

*Primary Examiner* — Donald L Mills
(74) *Attorney, Agent, or Firm* — Conley Rose, P.C.

(57) ABSTRACT

A controller obtains service information, and determines at least one forwarding device based on the service information. The controller generates an instruction list based on the service information and network function information of the at least one forwarding device, where the network function information is used to indicate a network function of the at least one forwarding device, and the instruction list includes a control instruction generated by the controller for the at least one forwarding device. The controller sends the corresponding control instruction in the instruction list to the at least one forwarding device, where the control instruction is used to instruct the at least one forwarding device to perform corresponding processing on a service packet of a service corresponding to the service information.

20 Claims, 10 Drawing Sheets

(51) Int. Cl.
  *H04L 45/00* (2022.01)
  *H04L 45/64* (2022.01)
  *H04L 45/745* (2022.01)

(56) References Cited

U.S. PATENT DOCUMENTS

| | | |
|---|---|---|
| 2014/0250239 A1 | 9/2014 | Lambert et al. |
| 2015/0319036 A1 | 11/2015 | Zhang et al. |
| 2016/0248860 A1 | 8/2016 | Dunbar et al. |
| 2017/0048138 A1* | 2/2017 | Sivabalan ............. H04L 47/825 |
| 2017/0244631 A1* | 8/2017 | Guichard ................ H04L 45/50 |
| 2017/0324654 A1* | 11/2017 | Previdi ................. H04L 45/306 |
| 2019/0075041 A1* | 3/2019 | Wang .................... H04L 45/745 |
| 2019/0081885 A1 | 3/2019 | Wang et al. |
| 2019/0253349 A1* | 8/2019 | Thurber .................. H04L 67/34 |
| 2021/0112007 A1* | 4/2021 | Huang .................... H04L 45/42 |

FOREIGN PATENT DOCUMENTS

| | | |
|---|---|---|
| CN | 102547583 A | 7/2012 |
| CN | 102624615 A | 8/2012 |
| CN | 102625363 A | 8/2012 |
| CN | 104125089 A | 10/2014 |
| CN | 104243299 A | 12/2014 |
| CN | 105577540 A | 5/2016 |
| CN | 105827529 A | 8/2016 |
| CN | 105915427 A | 8/2016 |
| CN | 106790656 A | 5/2017 |
| CN | 106982134 A | 7/2017 |
| CN | 107181663 A | 9/2017 |
| CN | 107409089 A | 11/2017 |
| CN | 108512758 A | 9/2018 |
| WO | 2015141014 A1 | 9/2015 |
| WO | 2016058185 A1 | 4/2016 |
| WO | 2017206793 A1 | 12/2017 |

OTHER PUBLICATIONS

"OpenFlow Switch Specification, Version 1.5.0 (Protocol version 0x06)," Dec. 19, 2014, 227 pages.

Open Networking Foundation, "L4-L7 Service Function Chaining Solution Architecture," Version 1.0, Jun. 14, 2015, 36 pages.

Chen, Z, et al, "A Technology Research of Network Orchestration," Beijing University of Post and Telecommunication, Beijing 100876, China, 01 Issue, 2016, 9 pages. With an English Abstract.

Baidu,URL: http://blog.sina.com.cn/s/blog_768df4d70102wm0b. html,"SDN Study notes," Sep. 8, 2016, 8 pages. With an English Version.

* cited by examiner

PACKET PROCESSING METHOD, CONTROLLER, AND FORWARDING DEVICE

CROSS-REFERENCE TO RELATED APPLICATIONS

This application is a continuation of International Patent Application No. PCT/CN2019/077009, filed on Mar. 5, 2019, which claims priority to Chinese Patent Application No. 201810186956.3, filed on Mar. 7, 2018. The disclosures of the aforementioned applications are hereby incorporated by reference in their entireties.

TECHNICAL FIELD

This application relates to the field of communications technologies, and in particular, to a packet processing method, a controller, and a forwarding device.

BACKGROUND

With development of network technologies, there is an increasing quantity of data service types, and the data service types have different network transmission requirements. How to transmit a transmission packet corresponding to each data service type with high quality is most researched in the field of the network technologies.

Currently, to meet different network transmission requirements of different data service types, a segment routing technology emerges. A controller obtains a network topology and a segment identifier (SID), then calculates a forwarding path of a packet, and transmits, to an ingress node, a group of explicit paths represented by SIDs, that is, a segment routing list (segment list). The ingress node encapsulates the group of explicit paths represented by the SIDs into the packet. Then, each node performs corresponding processing on the packet based on the segment list during segment routing.

However, after the controller generates the group of explicit paths represented by the SIDs for the packet, the ingress node encapsulates the explicit paths into the packet. Because the explicit path is a fixed path for processing the packet and is encapsulated into the packet, packet processing flexibility is relatively low when the packet is processed based on the explicit path.

SUMMARY

Embodiments of this application provide a packet processing method, a controller, and a forwarding device, to improve packet processing flexibility.

According to a first aspect, an embodiment of this application provides a packet processing method, including the following steps.

When a transmit end in a network requests a service, the transmit end sends service information to a controller. The transmit end may request the service on a user side in the network, or may request the service on a user side when a requirement of the user side for the network changes. Alternatively, when a new base station is added to the network, the base station may send the service information to the controller. This is not limited in this application. The controller may obtain the service information sent by the transmit end, and determine at least one forwarding device based on the service information. Then, the controller may generate an instruction list based on the service information and a network function of the at least one forwarding device, where the network function information is used to indicate a network function of the at least one forwarding device, and the instruction list includes a control instruction generated by the controller for the at least one forwarding device. Then, after generating the instruction list, the controller sends the corresponding control instruction in the instruction list to the at least one forwarding device, where the control instruction is used to instruct the at least one forwarding device to perform corresponding processing on a service packet of a service corresponding to the service information.

In this embodiment of this application, the controller obtains the service information, determines the at least one forwarding device based on the service information, generates the instruction list based on the service information and the network function of the at least one forwarding device, and then sends the control instruction in the instruction list to the at least one forwarding device. Then, the at least one forwarding device may perform corresponding processing on the service packet according to the control instruction, instead of processing the packet based on a fixed explicit path in the packet. This improves packet processing flexibility.

In a possible implementation, before the controller generates the instruction list based on the service information and the network function information of the at least one forwarding device, the method may further include obtaining the network function information from the at least one forwarding device.

In this embodiment of this application, the network function information of the at least one forwarding device may be obtained by the controller from the at least one forwarding device. Therefore, a specific manner of obtaining the network function information of the at least one forwarding device is provided. In an embodiment, realizability of the solution is improved.

In another possible implementation, the network function information may include a function instruction set, and the function instruction set may be a set of network function instructions sent by the at least one forwarding device to the controller.

In another possible implementation, the service information may include a destination address of the service. That the controller determines the at least one forwarding device based on the service information may be that the controller may calculate, based on the destination address, a forwarding path corresponding to the service packet, where the at least one forwarding device is a device on the forwarding path.

In this embodiment of this application, the service information may include the destination address of the service, and the controller may calculate the forwarding path of the service packet based on the destination address. Therefore, a specific method for calculating the forwarding path of the service packet is provided. In an embodiment, realizability of the solution is improved.

In another possible implementation, that the controller may generate the instruction list based on the service information and the network function information of the at least one forwarding device may be that the controller may generate the instruction list based on the service information, the forwarding path, and the network function information of the at least one forwarding device.

In this embodiment of this application, the controller may generate the instruction list based on the service information, the forwarding path, and the network function information of the at least one forwarding device. Therefore, a specific manner in which the controller generates the instruction list is provided. In an embodiment, realizability of the solution is improved.

In another possible implementation, the service information may include a service type of the service. That the controller may generate the instruction list based on the service information, the forwarding path, and network function information of the at least one forwarding device may include the following steps. First, the controller may determine an orchestration template corresponding to the service type, where the orchestration template is used to indicate a network function requirement corresponding to the service type. Then, the controller may generate the instruction list based on the forwarding path, the orchestration template, and the network function information of the at least one forwarding device, where the instruction list includes a forwarding instruction generated by the controller for the at least one forwarding device.

In this embodiment of this application, the service information includes the service type of the service. The controller may determine the orchestration template corresponding to the service type. Then, the controller may generate the instruction list based on the forwarding path, the orchestration template, and the network function information of the at least one forwarding device. Therefore, a specific method in which the controller generates the instruction list is provided. In an embodiment, realizability of the solution is improved.

In another possible implementation, the control instruction may include a forwarding instruction, and the at least one forwarding device may be a device having a packet forwarding function. That the controller may generate the instruction list based on the forwarding path, the orchestration template, and the network function information of the at least one forwarding device may include the following steps. First, the controller may determine network function information that is of the at least one forwarding device and that corresponds to the orchestration template. Then, the controller may generate the forwarding instruction based on the forwarding path and the network function information that is of the at least one forwarding device and that corresponds to the orchestration template. Finally, the controller may generate the instruction list based on the generated forwarding instruction.

In this embodiment of this application, the control instruction may be the forwarding instruction, and the at least one forwarding device may be the device having a packet forwarding function. The controller may determine network function information that is of the at least one forwarding device and that corresponds to the orchestration template. Then, the controller may generate the forwarding instruction based on the forwarding path and the network function information that is of the at least one forwarding device and that corresponds to the orchestration template, and then generate the instruction list based on the generated forwarding instruction. Therefore, a specific method in which the controller generates the instruction list is provided. In an embodiment, realizability of the solution is improved.

In another possible implementation, the control instruction may include a forwarding instruction. After the controller may obtain the service information, before the controller may generate the instruction list based on the service information and the network function information of the at least one forwarding device, the method may further include determining that the service corresponding to the service information is a multicast service.

In this embodiment of this application, the controller may determine that the service is the multicast service. Therefore, this application is applicable to multicast service processing. In an embodiment, practicability and completeness of the solution are improved.

In another possible implementation, that the controller may send the corresponding control instruction in the instruction list to the at least one forwarding device may include that the controller may send at least two forwarding instructions in the instruction list to a forwarding device having a replication function in the at least one forwarding device, where the at least two forwarding instructions are used to instruct the forwarding device having a replication function to replicate and forward the service packet of the multicast service.

In this embodiment of this application, the controller may send the at least two forwarding instructions in the instruction list to the forwarding device having a replication function in the at least one forwarding device, where the at least two forwarding instructions are used to instruct the forwarding device having a replication function to replicate and forward the service packet of the multicast service. Therefore, for the multicast service, the controller may generate the at least two forwarding instructions for the forwarding device having a replication function in the at least one forwarding device, and send the at least two forwarding instructions to the forwarding device having a replication function such that the forwarding device having a replication function can replicate and forward the service packet of the multicast service. In an embodiment, realizability and practicability of the solution are improved.

In another possible implementation, the control instruction may include an encapsulation instruction and a forwarding instruction. That the controller may send the corresponding control instruction in the instruction list to the at least one forwarding device may include that the controller may send the corresponding encapsulation instruction and the corresponding forwarding instruction in the instruction list to the at least one forwarding device such that the at least one forwarding device can correspondingly encapsulate the service packet according to the encapsulation instruction, to obtain an encapsulated packet, and the at least one forwarding device can correspondingly forward the encapsulated packet according to the forwarding instruction.

In this embodiment of this application, the control instruction may include the encapsulation instruction and the forwarding instruction. The controller may send the corresponding encapsulation instruction and the corresponding forwarding instruction in the instruction list to the at least one forwarding device such that the at least one forwarding device can correspondingly encapsulate the service packet according to the encapsulation instruction, to obtain the encapsulated packet, and the at least one forwarding device can correspondingly forward the encapsulated packet according to the forwarding instruction. Therefore, for a service packet that needs to be encapsulated before being forwarded, the controller generates a corresponding encapsulation instruction and a corresponding forwarding instruction for the at least one forwarding device, and sends the corresponding encapsulation instruction and the corresponding forwarding instruction to the at least one forwarding device. In an embodiment, practicability and completeness of the solution are improved.

In another possible implementation, the service information may include an encapsulation type of the service packet. Before the controller sends the corresponding control instruction in the instruction list to the at least one forwarding device, the method may further include allocating a corresponding service label to the service based on the encapsulation type.

In this embodiment of this application, the controller may allocate the corresponding service label to the service based on the encapsulation type such that the at least one forwarding device can subsequently process the service packet of the service based on the service label using the corresponding control instruction. Therefore, a network function is flexibly used using a service label, the network is decoupled from a service, and practicability and completeness of the solution are improved.

In another possible implementation, after the controller may allocate the corresponding service label to the service based on the encapsulation type, and before the controller may send the corresponding control instruction in the instruction list to the at least one forwarding device, the method may further include sending the service label and the encapsulation type to the transmit end of the service packet, where the service label is used to instruct the transmit end to encapsulate the service packet based on the encapsulation type.

In this embodiment of this application, after the controller allocates the service label to the service, the controller sends the service label and the encapsulation type to the transmit end such that the transmit end can encapsulate the service packet based on the encapsulation type. In this case, the service packet includes the service label such that the service packet can be correspondingly processed using the service label and the corresponding control instruction in the at least one forwarding device subsequently. Therefore, realizability and completeness of the solution are improved.

According to a second aspect, an embodiment of this application provides a packet processing method, including the following steps.

When a transmit end requests a service, the transmit end sends service information to a controller. The controller generates an instruction list based on the service information and network function information of at least one forwarding device, where the instruction list includes a control instruction generated for the at least one forwarding device. Then, the controller sends a corresponding control instruction to the at least one forwarding device. Therefore, the forwarding device may receive the control instruction sent by the controller, and then the forwarding device performs, according to the control instruction, a corresponding operation on a service packet of a service corresponding to the service information.

In this embodiment of this application, the forwarding device receives the control instruction sent by the controller, and then correspondingly processes, according to the control instruction, the service packet of the service corresponding to the service information. Therefore, the forwarding device processes the service packet according to the control instruction, instead of correspondingly processing the packet based on a fixed explicit path in the service packet. This improves flexibility of packet processing by the forwarding device.

In a possible implementation, before the forwarding device may receive the control instruction sent by the controller, the method may further include sending the network function information to the controller, where the network function information is used to indicate a network function of the forwarding device.

In this embodiment of this application, the forwarding device may send the network function information to the controller. Therefore, an obtaining manner in which the controller obtains the network function information is provided. In an embodiment, realizability of the solution is improved.

In another possible implementation, before the forwarding device may send the network function information to the controller, the method may further include generating a network function instruction, where the network function instruction is used to indicate the network function of the forwarding device, and one network function instruction corresponds to one or more network functions. That the forwarding device may send the network function information to the controller may include that the forwarding device may send the network function instruction to the controller.

In this embodiment of this application, the forwarding device may generate the network function instruction, and then send the network function instruction to the controller. Therefore, the network function information may be the network function instruction. In an embodiment, realizability of the solution is improved.

In another possible implementation, the forwarding device may be a device having a forwarding function, or a device having a packet replication function and a forwarding function, or a device having a corresponding encapsulation function and a forwarding function.

In this embodiment of this application, the forwarding device may be the device having a forwarding function, or the device having a packet replication function and a forwarding function, or the device having a corresponding encapsulation function and a forwarding function. In an embodiment, realizability of the solution is improved.

In another possible implementation, the service corresponding to the service information may be a multicast service, the control instruction may be a forwarding instruction, and the forwarding device may be a device having a packet replication function and a forwarding function. That the forwarding device may receive the control instruction sent by the controller may include that the forwarding device may receive at least two forwarding instructions sent by the controller.

In this embodiment of this application, the service corresponding to the service information may be the multicast service, the control instruction may be the forwarding instruction, and the forwarding device may be the device having a packet replication function and a forwarding function. The forwarding device may receive the at least two forwarding instructions sent by the controller. Therefore, for the multicast service, the forwarding device may receive the at least two forwarding instructions sent by the controller, to correspondingly process the service packet of the multicast service. In an embodiment, practicability and completeness of the solution are improved.

In another possible implementation, that the forwarding device may perform the corresponding operation on the service packet according to the control instruction may include the following steps. First, the forwarding device may replicate, based on a target quantity of times, the service packet corresponding to the multicast service, to obtain a replicated service packet, where the target quantity of times is less than a quantity of the at least two forwarding instructions by 1. Then, the forwarding device may correspondingly forward, according to the at least two forwarding instructions, the service packet corresponding to the multicast service and the replicated service packet.

In this embodiment of this application, the forwarding device may replicate, based on the target quantity of times, the service packet corresponding to the multicast service, to obtain the replicated service packet, and then the forwarding device may correspondingly forward, according to the at least two forwarding instructions, the service packet corresponding to the multicast service and the replicated service packet. Therefore, a specific manner of performing a corresponding operation is provided. In an embodiment, realizability of the solution is improved.

In another possible implementation, the forwarding device may be a device having a corresponding encapsulation function and a forwarding function, and the control instruction may include an encapsulation instruction and a forwarding instruction. That the forwarding device receives the control instruction sent by the controller may include that the forwarding device may receive the encapsulation instruction and the forwarding instruction that are sent by the controller. That the forwarding device may perform, according to the control instruction, the corresponding operation on the service packet of the service corresponding to the service information may include the following steps. First, the forwarding device may correspondingly encapsulate the service packet according to the encapsulation instruction, to obtain an encapsulated service packet. Then, the forwarding device correspondingly forwards the encapsulated service packet according to the forwarding instruction.

In this embodiment of this application, the forwarding device may be the device having a corresponding encapsulation function and a forwarding function, and the control instruction may include the encapsulation instruction and the forwarding instruction. The forwarding device may receive the encapsulation instruction and the forwarding instruction that are sent by the controller. The forwarding device may correspondingly encapsulate the service packet according to the encapsulation instruction, to obtain the encapsulated service packet. Then, the forwarding device correspondingly forwards the encapsulated service packet according to the forwarding instruction. Therefore, for a service packet that needs to be encapsulated before being forwarded, the controller generates the corresponding encapsulation instruction and the corresponding forwarding instruction for the forwarding device. After receiving the encapsulation instruction and the forwarding instruction that are sent by the controller, the forwarding device correspondingly encapsulates the service packet according to the encapsulation instruction, and then correspondingly forwards the service packet according to the forwarding instruction. Therefore, in an embodiment, completeness of the solution is improved.

In another possible implementation, the control instruction may include a forwarding instruction, and the forwarding device may be a device having a forwarding function. That the forwarding device may perform, according to the control instruction, the corresponding operation on the service packet of the service corresponding to the service information may include the following steps. First, the forwarding device may generate a forwarding table based on the forwarding instruction, and then the forwarding device may forward the service packet based on the forwarding table.

In this embodiment of this application, the control instruction may include the forwarding instruction, and the forwarding device may be the device having a forwarding function. The forwarding device may generate the forwarding table based on the forwarding instruction, and then the forwarding device may forward the service packet based on the forwarding table. Therefore, a specific method in which the forwarding device performs a corresponding operation is provided. In an embodiment, realizability of the solution is improved.

According to a third aspect, an embodiment of this application provides a controller, and the controller has functions of implementing behavior of the controller in the foregoing first aspect. The functions may be implemented using hardware, or may be implemented by hardware executing corresponding software. The hardware or the software includes one or more modules corresponding to the functions.

According to a fourth aspect, an embodiment of this application provides a forwarding device, and the forwarding device has functions of implementing behavior of the forwarding device in the foregoing second aspect. The functions may be implemented using hardware, or may be implemented by hardware executing corresponding software. The hardware or the software includes one or more modules corresponding to the functions.

According to a fifth aspect, an embodiment of this application provides a controller, and the controller includes a processor, a memory, an input/output device, and a bus. The processor, the memory, and the input/output device are separately connected to the bus. The memory stores a computer instruction, and when the processor executes the computer instruction in the memory, the processor is enabled to implement any implementation of the first aspect.

According to a sixth aspect, an embodiment of this application provides a forwarding device, and the forwarding device includes a processor, a memory, an input/output device, and a bus. The processor, the memory, and the input/output device are separately connected to the bus. The memory stores a computer instruction, and when the processor executes the computer instruction in the memory, the processor is enabled to implement any implementation of the second aspect.

According to a seventh aspect, an embodiment of this application provides a chip system. The chip system includes a processor configured to support a network device in implementing functions in the foregoing first aspect, for example, sending or processing data and/or information in the foregoing methods. In a possible design, the chip system further includes a memory. The memory is configured to store a program instruction and data that are necessary for the network device. The chip system may include a chip, or may include a chip and another discrete component.

According to an eighth aspect, an embodiment of this application provides a chip system. The chip system includes a processor configured to support a network device in implementing functions in the foregoing second aspect, for example, sending or processing data and/or information in the foregoing methods. In a possible design, the chip system further includes a memory. The memory is configured to store a program instruction and data that are necessary for the network device. The chip system may include a chip, or may include a chip and another discrete component.

According to a ninth aspect, an embodiment of this application provides a computer program product including an instruction. When the computer program product is run on a computer, the computer is enabled to perform any implementation in the first aspect or the second aspect.

According to a tenth aspect, an embodiment of this application provides a computer-readable storage medium. The computer-readable storage medium includes an instruction, and when the instruction is run on a computer, the computer is enabled to perform any implementation in the first aspect or the second aspect.

According to an eleventh aspect, an embodiment of this application provides a packet processing system, including the controller according to the third aspect and the forwarding device according to the fourth aspect.

DESCRIPTION OF EMBODIMENTS

The following describes the embodiments of the present disclosure with reference to accompanying drawings.

Figure 1:
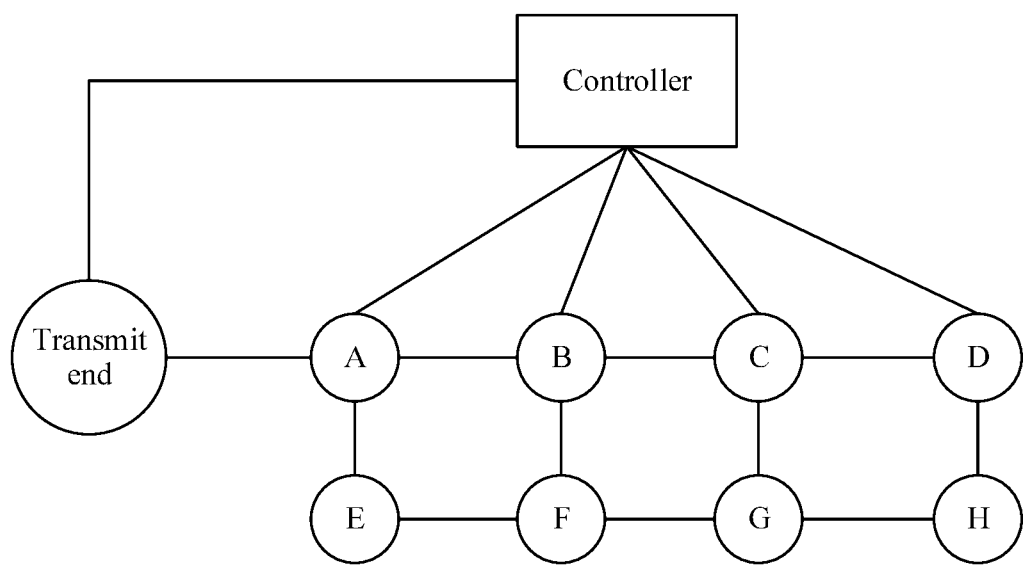
FIG. 1 is a schematic diagram of an application scenario framework according to an embodiment of this application.

FIG. 1 is a schematic diagram of an application scenario framework according to this application. The figure is a schematic diagram of a framework applied to a fourth generation (4G) network according to this application. It should be noted that this application is applicable to different network architectures, for example, a third generation (3G) network, the 4G network, and a fifth generation (5G) network. This is not limited in this application. An example in which this application is applied to a 4G network architecture is used below for description. In FIG. 1, A, B, C, D, E, F, G, and H are forwarding devices that each are configured to send a function instruction set to a controller. The function instruction set is used to indicate a network function of the forwarding device, and the network function is a function owned by the network device in a communications network. For example, the forwarding device A has a packet forwarding function or a packet loss measurement function. The forwarding devices each are further configured to receive a control instruction that is delivered by the controller and that is used to control processing of a target service, and perform corresponding packet processing according to the control instruction. It should be noted that, in the network architecture, the forwarding devices may be connected in another connection manner, and more forwarding devices may be connected to the controller. FIG. 1 is merely used as an example for description. This is not limited in this application. The controller is configured to control the forwarding device to perform packet processing. In this application, first, the controller collects network function information of each of the forwarding devices A, B, C, D, E, F, G, and H, performs calculation and orchestration based on service information sent by a transmit end, and then generates a control instruction and delivers the control instruction to the forwarding device such that the forwarding device performs corresponding processing on a service packet according to the control instruction, where a base station is a base station in the 4G network, and the service information may be sent to the controller through the base station. Then, the controller may receive the service information, generate an instruction based on the service information and the network function of the forwarding device, and deliver the corresponding instruction to the forwarding device such that the forwarding device can perform corresponding processing on a service packet of a service corresponding to the service information.

It should be noted that the forwarding device in this application may be a router or a switch. This is not specifically limited herein.

In this embodiment of this application, the controller obtains service information, and the service information is information sent by the transmit end to the controller. It should be noted that the transmit end may be a base station, or may be user equipment or a user access device, or may be an application program in a software-defined network (SDN). This is not specifically limited herein. In addition, it should be noted that the service information may be a message used by the transmit end to request to perform traffic statistics collection on a service packet transmitted in the network, or may be a message used by the transmit end to request to transmit a service packet, or may be used by the transmit end to request to transmit a service packet, and the service packet is a service packet of a multicast service or a service packet of an encryption service. This is not specifically limited herein. For example, if the transmit end sends, to the controller, the service information used to request to transmit the service packet, the service information includes a destination address of the service and/or a service type of the service. In this case, the controller generates a forwarding instruction for a forwarding device based on the service information and a network function of the forwarding device, and then delivers the forwarding instruction to the target forwarding device such that the forwarding device can correspondingly forward, according to the forwarding instruction, the service packet of the service corresponding to the service information, where the forwarding device has a packet forwarding function. For another example, if the transmit end requests to perform packet loss measurement, on a forwarding path within a period of time, for the service packet of the service corresponding to the service information, the controller generates a packet loss measurement instruction based on the service information and a network function of a forwarding device, and then delivers the packet loss measurement instruction to the corresponding target forwarding device, where the forwarding device has a packet loss measurement function.

It should be noted that a forwarding device may report network function information of the forwarding device to the controller using a function instruction, or may report a network function of the forwarding device in another form. This is not specifically limited herein. Subsequent embodiments are described using an example in which a forwarding device reports a network function of the forwarding device to the controller in a form of a function instruction.

In this embodiment of this application, the forwarding devices controlled by the controller have various network functions, and the forwarding devices may have different network functions. The controller delivers corresponding control instructions to corresponding forwarding devices based on the network functions of the forwarding devices and service information. Therefore, a forwarding device may be a forwarding device having a forwarding function, or may be a forwarding device having a packet replication function and a forwarding function, or may be a forwarding device having a corresponding encapsulation capability. This is not specifically limited herein. In subsequent embodiments, if a forwarding device can receive a corresponding function instruction, it indicates that the forwarding device has the network function. The controller delivers a corresponding control instruction only after the controller determines the network function of the forwarding device before the controller delivers the control instruction such that the service packet corresponding to the service information is processed using the control instruction.

In this embodiment of this application, when forwarding the service packet of the service corresponding to the service information, the controller may allocate a service label to the service such that the forwarding device subsequently forwards the service packet based on the service label using a corresponding instruction. The service label may be globally unique or locally unique, provided that the network device can identify the service and distinguish the service from another service in a forwarding process. In addition, the service may be alternatively identified in another manner. This is not specifically limited herein. The subsequent embodiments are described using an example in which the controller allocates a service label to the service to forward the service packet.

In this embodiment of this application, that the controller obtains a function instruction set of a forwarding device may be that the controller obtains function instructions of all forwarding devices controlled by the controller, or may be that the controller obtains a function instruction of a forwarding device required for subsequently processing the service packet. This is not specifically limited herein. The subsequent embodiments are described using an example in which the controller obtains a function instruction of a forwarding device required for subsequently processing the service packet.

In this embodiment of this application, the controller delivers a control instruction to a corresponding forwarding device, and the forwarding device performs corresponding processing on the service packet. Details are described below using FIG. 2A and FIG. 2B.

Figure 2A:
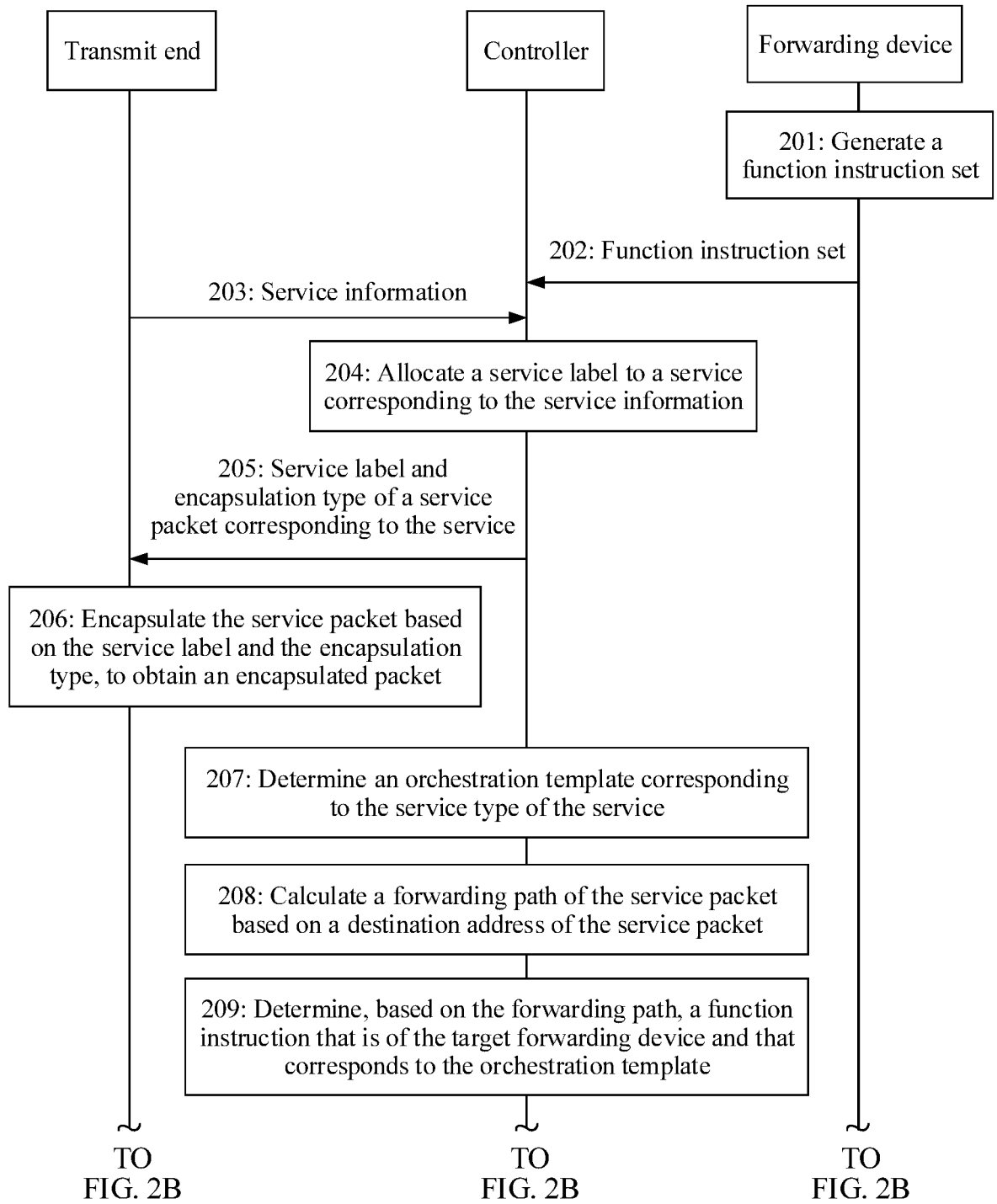
FIG. 2A and FIG. 2B are a schematic diagram of an embodiment of a packet processing method according to an embodiment of this application.
Figure 2B:
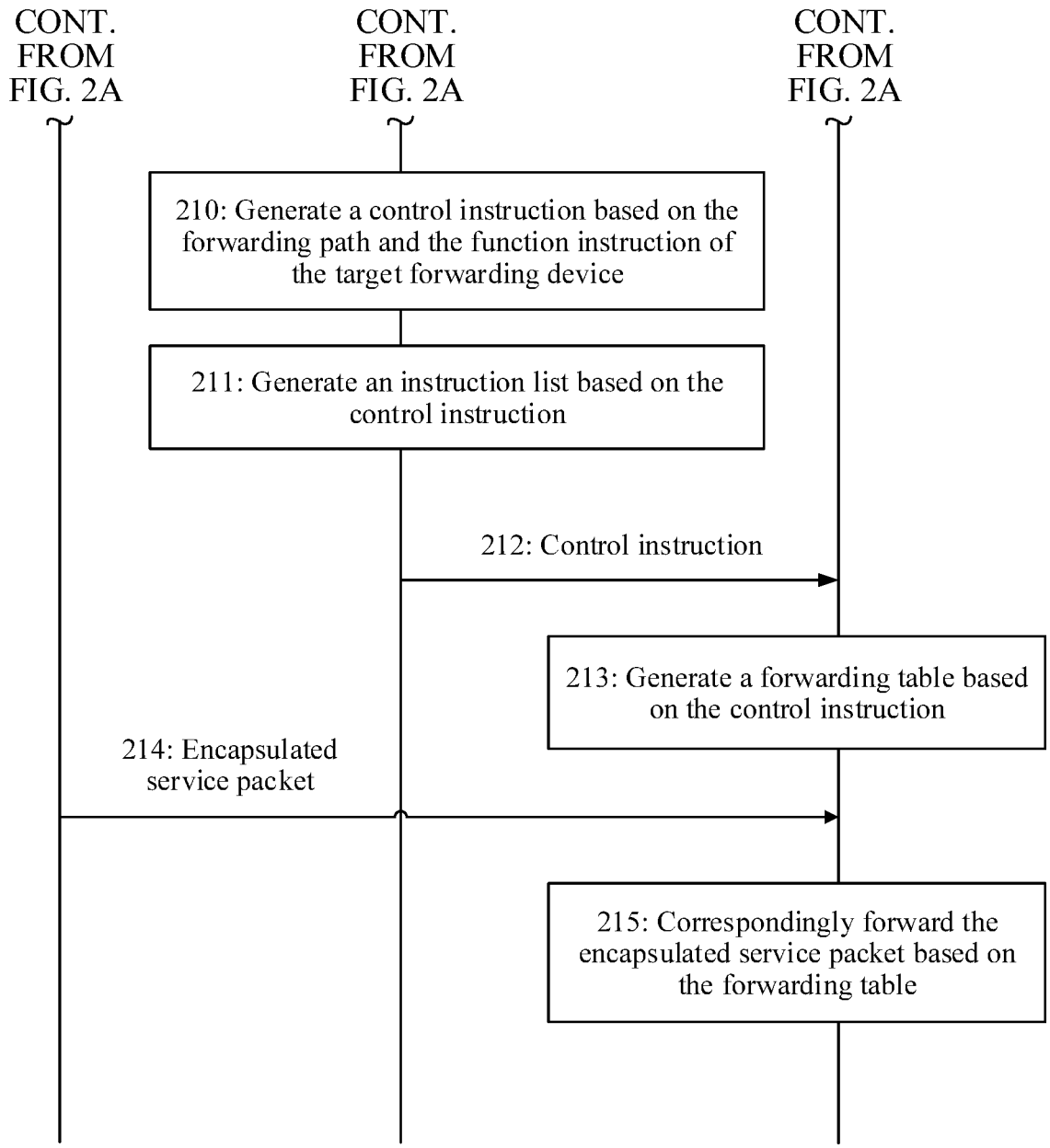

Referring to FIG. 2A and FIG. 2B, in an embodiment in FIG. 2A and FIG. 2B, a controller obtains service information, generates a forwarding instruction using the service information and network function information of a forwarding device, and then sends the forwarding instruction to the corresponding forwarding device such that the forwarding device forwards a service packet corresponding to the service information. An embodiment of a data processing method in the embodiments of this application includes the following steps.

201. The forwarding device generates a function instruction set.

The forwarding device generates the function instruction set. The function instruction set includes a plurality of function instructions, and the function instruction is used to indicate a specific network function of the forwarding device. The forwarding device may describe a network function of the forwarding device based on an encoding format in Table 1, Table 2, Table 3, Table 4, and Table 5 such that a corresponding control instruction is generated. In addition, it should be noted that the forwarding device may further describe another network function of the forwarding device in a form of an instruction, for example, a function instruction corresponding to an instruction format definition. The encoding format in Table 1, Table 2, Table 3, Table 4, and Table 5 is merely used as an example for description herein. During application, more network functions may be described based on an actual situation requirement using instructions. In Table 1, different types of tunnel encapsulation instructions are defined, to specify a specific tunnel through which a device encapsulates a packet. In Table 1, SrcIP is a source address, DestIP is a destination address, TunnelID is a service label, a User Datagram Protocol (UDP) port, a tunnel key is a tunnel keyword, and a tunnel key length is a tunnel keyword length. Table 1 shows a tunnel encapsulation type, including generic routing encapsulation (GRE), UDP encapsulation, and Internet Protocol (IP)-based upper-layer protocol such as General Packet Radio Service (GPRS) Tunneling Protocol (GTP) encapsulation. For example, for a GRE encapsulation instruction, an operation code is "0x88", a tunnel type is "0x03", a tunnel key is "SrcIP+DestIP+TunnelID", and a tunnel key length is 12 bytes.

TABLE 1

| Tunnel encapsulation type | Operation code | Tunnel type | Tunnel key length | Tunnel key |
|---|---|---|---|---|
| GRE encapsulation | 0x88 | 0x03 | 12 | SrcIP + DestIP + TunnelID |
| UDP encapsulation | 0x88 | 0x04 | 12 | SrcIP + DestIP + UDP Port |
| GTP encapsulation | 0x88 | 0x05 | 8 | SrcIP + DestIP |

In Table 2, encapsulation instructions of different packet types are defined, to describe specific packet encapsulation. Table 2 shows a packet encapsulation encoding format, including IP packet encapsulation and multiprotocol label switching (MPLS) label encapsulation, where SrcIP is a source address, DestIP is a destination address, a time-to-live (TTL) is a time to live value of an IP packet, a differentiated services code point (DSCP) is a differentiated services code point in an IP packet header, and a label value is a label value of an MPLS packet. For example, it can be learned from Table 2 that an operation code corresponding to an encapsulation instruction for encapsulating a service packet into an IP packet is "0x89", a packet type is "0x03", and a packet attribute is "SrcIP+DestIP+TTL+DSCP".

TABLE 2

| Packet encapsulation encoding format | | |
|---|---|---|
| Operation code | Packet type | Packet attribute |
| IP packet encapsulation | | |
| 0x89 | 0x03 | SrcIP + DestIP + TTL + DSCP |
| MPLS label encapsulation | | |
| 0x88 | 0x04 | Label value |

In Table 3, a packet forwarding instruction is defined, to describe a specific packet forwarding action, including IP packet forwarding, MPLS packet forwarding, IP packet backup forwarding, and the like. For example, an IP packet forwarding instruction indicates that the forwarding device can forward an IP packet, and the forwarding device reports an IP packet forwarding function of the forwarding device to the controller using the instruction. In Table 3, "Outif+ nexthop" indicates an outbound interface and next hop information for forwarding, and "Outif+nexthop+outlabel" indicates the outbound interface, the next hop information, and a service label value.

TABLE 3

Packet forwarding encoding format

| Operation code | Packet type | Forwarding attribute |
|---|---|---|
| IP packet forwarding | | |
| 0x90 | 0x03 | Outif + nexthop |
| MPLS packet forwarding | | |
| 0x90 | 0x04 | Outif + nexthop + outlabel |
| IP packet backup forwarding | | |
| 0x90 | 0x05 | Outif + nexthop |
| MPLS packet backup forwarding | | |
| 0x90 | 0x06 | Outif + nexthop + outlabel |
| ... | | |

Table 4 is packet forwarding encoding format. During packet forwarding, forwarding is performed based on a forwarding equivalence class (FEC). In an embodiment, a specific packet forwarding action is described, where "IP address" is an IP address, and "IPv6 address" is an IP version 6 (IPv6) address.

TABLE 4

Packet forwarding (specified-FEC forwarding) encoding format

| Operation code | FEC type | FEC description |
|---|---|---|
| IPv4 address based forwarding | | |
| 0x91 | 0x05 | IP address |
| IPv6 address based forwarding | | |
| 0x91 | 0x04 | IPv6 address |
| ... | | |

In Table 5, a function of performing packet performance measurement is described. The packet performance measurement may include delay measurement and packet loss measurement.

TABLE 5

Performance measurement encoding format

| Operation code | Measurement type | Data sending |
|---|---|---|
| Delay measurement | | |
| 0x92 | 0x03 | Destination IP + Sending mode |
| Packet loss measurement | | |
| 0x92 | 0x04 | Destination IP + Sending mode |

The forwarding device generates the function instruction set. For example, if the forwarding device has a GRE tunnel to a destination address (1.1.1.1), a source address of the tunnel is (2.2.2.2), and TunnelID is "0x1234". In this case, it can be learned that the forwarding device has a GRE encapsulation function. Therefore, the forwarding device uses a corresponding GRE encapsulation instruction in Table 1, in an embodiment, the forwarding device generates a GRE encapsulation instruction "0x880C02020202010101011234". If the forwarding device has an MPLS encapsulation function, it can be learned from Table 2 that an MPLS encapsulation instruction generated by the forwarding device is "0x88040000". If the forwarding device has an IP packet forwarding function, it can be learned from Table 3 that the forwarding device generates an IP packet forwarding instruction "0x90031234567801010101". Because the forwarding device describes network functions of the forwarding device by generating instructions, the instructions may be one function instruction set used to indicate the network functions of the forwarding device. Therefore, forwarding devices controlled by the controller all describe network functions of the forwarding devices using instructions, then generate function instruction sets, and report the function instruction sets to the controller. The controller may determine the network functions of all the forwarding devices using the function instruction sets.

202. The forwarding device sends the function instruction set to the controller.

In step 201, the forwarding device describes the network function of the forwarding device in a form of generating a function instruction. Therefore, the forwarding device sends the generated function instruction set to the controller. It should be noted that the forwarding device may report the network function of the forwarding device to the controller through an interface, and a type of the interface is not limited herein. The forwarding device may send a function instruction to the controller using a Border Gateway Protocol (BGP), an Interior Gateway Protocol (IGP), or another extended protocol. This is not specifically limited herein.

203. A transmit end sends the service information to the controller.

When a new base station is added to a network, or when a network requirement of a user side changes, or when user equipment needs to send a service packet to a receive end, the transmit end sends the service information to the controller. The service information sent by the transmit end includes a service type of a service corresponding to the service information, a destination address of a service packet corresponding to the service, an encapsulation function of the transmit end, and the like. Specifically, the transmit end may describe related information of the service in a form of an instruction, and then send the service information including the related information to the controller. As shown in Table 6, Table 7, and Table 8, the transmit end may describe, in an encoding format in Table 6, Table 7, and Table 8, the related information of the service corresponding to the service information. Certainly, in an embodiment, there may be more encoding formats corresponding to network functions. Table 6, Table 7, and Table 8 are merely used as examples for description herein.

Table 6 is a description instruction of a user for the service type, where "Destination address" is a destination address.

TABLE 6

Service description encoding format

| Operation code | Service type | Destination address |
|---|---|---|
| Mobile service | | |
| 0x94 | 0x03 | Destination address |
| Broadband service | | |
| 0x94 | 0x04 | Destination address |

In Table 7, a description instruction for an encapsulation capability of a user side is defined, where "IP address" is an IP address, and a label value is a label value of an MPLS packet.

TABLE 7

Srv description encoding format

| Operation code | Encapsulation type. | Encapsulation attribute |
|---|---|---|
| IPv4 encapsulation | | |
| 0x95 | 0x03 | IP address |
| MPLS encapsulation | | |
| 0x94 | 0x04 | Label value |

In Table 8, an instruction of a specific network requirement of a user is defined, where a bandwidth represents a bandwidth value, and "SLA (Service Level Agreement)" is a service level agreement (SLA).

TABLE 8

SLA description encoding format

| Operation code | Measurement type | SLA value |
|---|---|---|
| Bandwidth | | |
| 0x93 | 0x03 | Bandwidth |
| Delay | | |
| 0x93 | 0x04 | Delay |

For example, the transmit end is a base station, the base station requests, from the controller, a path to a destination address (2.2.2.2), a service type of the service is a mobile Si service, a path delay requirement is less than 100 milliseconds (ms), and the transmit end has an MPLS packet encapsulation function. In this case, the base station may determine, from Table 6, that an operation code of an instruction used to describe the service type of the service as the mobile Si service is "0x94", the service type is "0x03", and the destination address is "2.2.2.2". It can be learned from Table 7 that an operation code used to describe an encapsulation type of the service packet of the service as MPLS packet encapsulation is "0x94", an encapsulation type is "0x04", and an encapsulation attribute is "0x0000". It can be learned from Table 8 that an operation code of an instruction indicating that a path delay is less than 100 ms is "0x93", a measurement type is "0x04", and a delay is 100 ms. The transmit end generates an instruction based on a network function requirement of the service, and adds the instruction to the service information.

204. The controller allocates a service label to the service corresponding to the service information.

After receiving the service information of the transmit end, the controller determines an encapsulation capability of the transmit end from the service information. That the controller determines an encapsulation capability of the transmit end from the service information may be that the controller determines the encapsulation capability of the transmit end using a description instruction for the encapsulation capability of the transmit end in the service information sent by the transmit end. Therefore, the controller allocates a globally unique service label Service identifier (ID) to the service packet of the service of the transmit end, to serve as an identifier of the service. The transmit end may have an IP packet encapsulation function, an MPLS encapsulation function, or the like. Herein, an example in which the transmit end has the MPLS packet encapsulation function is used for description. In this case, the service information carries an MPLS encapsulation instruction. It can be learned from Table 6 that an operation code of the encapsulation instruction is "0x94", an encapsulation type is "0x04", and an encapsulation attribute is "0x0000". In this case, the controller may determine, by identifying the operation code, the encapsulation type, and the like in the instruction, that the encapsulation function of the transmit end is the MPLS encapsulation function. Therefore, the controller allocates an MPLS label value to the service. An example in which the allocated label value is "0x1234" is used herein.

205. The controller sends the service label and the encapsulation type of the service packet corresponding to the service to the transmit end.

After allocating the service label to the service corresponding to the service information, the controller sends the service label to the transmit end. For example, if the label value allocated by the controller in step 204 is "0x1234", the controller sends, to the transmit end, the label value "0x1234" and information indicating that the encapsulation type is MPLS, in an embodiment, sends Service ID (0x1234) and type (MPLS) to the transmit end.

206. The transmit end encapsulates, based on the service label and the encapsulation type of the service packet, the service packet corresponding to the service, to obtain an encapsulated service packet.

After receiving the service label sent by the controller, the transmit end encapsulates the service packet corresponding to the service, to obtain the encapsulated service packet. For example, the transmit end is a base station. In step 205, it is determined that the encapsulation capability of the transmit end is MPLS encapsulation, and the allocated service label value is "0x1234". In this case, the base station in the 4G network, in other words, an eNodeB, performs MPLS encapsulation on the service packet, and encapsulates an outer layer of the service packet with an MPLS label, where a label value is "0x1234". Therefore, in this embodiment of this application, the transmit end encapsulates the service label into the outer layer of the packet such that the forwarding device subsequently forwards the service packet using the service label. Therefore, this application is also applicable to processing of an encrypted packet in an encryption scenario. This improves solution completeness and practicability. The forwarding device processes the service packet according to a corresponding instruction using the label value, and the instruction also carries the label value such that a network function is flexibly used using one Service ID.

207. The controller determines an orchestration template corresponding to the service type of the service.

The service information sent by the transmit end carries the service type of the service. Therefore, the controller may obtain, from the service information, the service type of the service that the transmit end requests to transmit, and then may determine the corresponding orchestration template. The orchestration template is a template that is preset in the controller, to define a method for implementing a network function of the service. Different service types correspond to different orchestration templates. For example, in step 203, if the service requested by the transmit end is the mobile Si service, the service information includes an instruction operation "0x94", a service type "0x03", and a destination address "2.2.2.2". In this instruction, the controller may determine that the service type of the service is a mobile service. Therefore, the controller may determine an orchestration template corresponding to the mobile service, and may determine, from the orchestration template, a network function for implementing the service.

208. The controller calculates a forwarding path of the service packet based on the destination address of the service packet.

The service information sent by the transmit end carries the destination address for transmitting the service packet. The controller may calculate the forwarding path of the service packet based on the destination address using an algorithm. For example, in step 203, the destination address of the service packet that the transmit end requests to transmit is "2.2.2.2", and therefore the controller determines, through calculation using the algorithm, that the forwarding path of the service packet is A-B-C-D in FIG. 1.

209. The controller determines, based on the forwarding path, a function instruction that is of the forwarding device and that corresponds to the orchestration template.

After the controller determines the forwarding path of the service packet, the controller determines the function instruction of the forwarding device based on the orchestration template. For example, if it is determined in step 208 that the forwarding path of the service packet is A-B-C-D, the controller determines a function instruction that is in A, B, C, and D and that corresponds to a network function requirement described in the orchestration template. For example, in the foregoing steps, it is determined that the encapsulation type of the service packet is an MPLS packet, the controller may alternatively determine, from function instruction sets of A, B, C, and D, that A, B, C, and D all have an MPLS packet forwarding function, and D further has an IP packet forwarding function. In this case, it may be determined from the orchestration template that required network functions of A, B, C, and D are forwarding the service packet using the four forwarding devices A, B, C, and D. Therefore, the controller may determine that MPLS packet forwarding function instructions of A, B, C, and D are required. It can be learned from Table 2 that, for the MPLS packet forwarding function instruction, an operation code is "0x90", a packet type is "0x04", and an encapsulation attribute is "Outif+nexthop+outlabel".

210. The controller generates the control instruction based on the forwarding path and the function instruction of the forwarding device.

After determining the function instruction of the forwarding device, the controller may generate the control instruction based on the forwarding path and the function instruction. The control instruction includes a forwarding instruction. For example, in step 209, the controller determines an MPLS packet forwarding function instruction of A, where an operation code is "0x90", a packet type is "0x04", and an encapsulation attribute is "Outif+nexthop+outlabel". In this case, the controller may determine, using the forwarding path, that A forwards the encapsulated service packet to B, B forwards the encapsulated service packet to C, and C forwards the encapsulated service packet to D. Therefore, it can be learned that a next hop of A is B. However, the label value allocated in step 204 is "0x1234". Therefore, the controller generates an MPLS packet forwarding instruction for A, which is specifically "0x900412345678050505051234". An action of B or C is the same as an action of A, which is an MPLS packet forwarding action. For D, the controller first generates a service label value pop-up instruction for D, and then generates an IP packet forwarding instruction. Specifically, the service label pop-up instruction is "0x89061234", and the IP packet forwarding instruction is "0x900312345678070707".

211. The controller generates an instruction list based on the control instruction.

After generating control instructions of all target forwarding device on the forwarding path, the controller generates the instruction list based on these control instructions. For example, in step 210, after generating corresponding instructions for the four nodes A, B, C, and D on the forwarding path, the controller generates one instruction list based on the instructions. As shown in Table 9, Service ID is a service label, a type is a packet type, and an action instruction is a specific instruction action.

TABLE 9

|  | Service ID | Type | Action instruction |
| --- | --- | --- | --- |
| Junction A | 0x1234 | MPLS | 0x900412345678050505051234 |
| Junction B | 0x1234 | MPLS | 0x900412345678060606061234 |
| Junction C | 0x1234 | MPLS | 0x900412345678060606061234 |
| Junction D | 0x1234 | MPLS | 0x89061234 |
|  |  |  | 0x900312345678070707 |

212. The controller sends the corresponding control instruction to the forwarding device.

After generating the instruction list based on the control instruction, the controller sends the corresponding control instruction to the forwarding device. Before the controller delivers the control instruction to the forwarding device, the controller determines the network function of the forwarding device based on the function instruction set of the forwarding device. Then, the controller generates the control instruction, and delivers the corresponding control instruction to the forwarding device such that the forwarding device can perform a corresponding operation based on the control instruction. For example, in step 208, the controller determines that the forwarding path of the encapsulated service packet is A-B-C-D. Therefore, the forwarding devices are A, B, C, and D, and the forwarding devices A, B, C, and D all have an MPLS packet forwarding capability such that the forwarding devices A, B, C, and D can forward an MPLS packet. It can be learned from the instruction list in Table 9 that the controller sends an MPLS packet forwarding instruction "0x900412345678050505051234" to A, sends an MPLS packet forwarding instruction "0x900412345678060606061234" to B, and sends an MPLS packet forwarding instruction "0x900412345678060606061234" to C. The forwarding device D is an outbound interface for forwarding the encapsulated service packet. In this case, the controller sends a service label pop-up instruction "0x89061234" and an IP packet forwarding instruction "0x900312345678070707" to D, where the service label pop-up instruction is used by the forwarding device D to pop up a service label at an outer layer of the encapsulated service packet, and then the forwarding device D forwards the service packet according to the IP packet forwarding instruction.

213. The forwarding device generates a forwarding table based on the control instruction.

After the forwarding device receives the control instruction delivered by the controller, if the control instruction is a forwarding instruction, the forwarding device generates a forwarding table based on the forwarding instruction, and the forwarding table is generated based on information in the forwarding instruction. For example, in step 212, if an MPLS packet instruction received by the forwarding device A is "0x900412345678060606061234", the forwarding device A may determine that a label value of the encapsulated service packet is "0x1234", an outbound interface is D, and a next hop address is an address of B. Therefore, the forwarding device may generate a "0x1234" label forwarding table based on the forwarding instruction. A process in which the forwarding device B or the forwarding device C generates a forwarding table is also similar to the process in which the forwarding device A generates a forwarding table, and details are not described again. Then, the forwarding device D receives the service label pop-up instruction "0x89061234" and the IP packet forwarding instruction "0x900312345678070707" that are sent by the controller. First, the forwarding device D generates a "0x1234" label egress forwarding table, and associates with an action of an IP forwarding table. In an embodiment, during forwarding, the label value "0x1234" in the packet is popped up first, and then the label value is forwarded to the destination address in a form of an IP packet.

214. The transmit end sends the encapsulated service packet to the forwarding device.

After encapsulating the service packet based on the corresponding encapsulation type using the label value, the transmit end sends the encapsulated service packet to the forwarding device. For example, in step 206, the transmit end encapsulates the label value "0x1234" of the service into the service packet in an MPLS encapsulation form, encapsulates an MPLS label with a label value "0x1234" into an outer layer, and then sends the encapsulated service packet to the forwarding device.

215. The forwarding device correspondingly forwards the encapsulated service packet based on the forwarding table.

After the forwarding device receives the encapsulated service packet, if the forwarding device determines that the service label in the encapsulated service packet is consistent with a label value in the forwarding table, the forwarding device may determine to correspondingly forward the encapsulated service packet using the forwarding table. For example, in step 214, the forwarding device A generates a forwarding table based on the MPLS packet forwarding instruction "0x900412345678060606061234". The forwarding device A may determine, using the outer label value "0x1234" of the encapsulated service packet, that the forwarding instruction is used to forward the encapsulated service packet, and may forward the encapsulated service packet to the target forwarding device B in an MPLS packet forwarding manner. The forwarding device B and the forwarding device C also correspondingly forward the encapsulated service packet in corresponding manners. When the forwarding device D receives the encapsulated service packet, the forwarding device first decapsulates the encapsulated packet based on an egress entry and the associated IP forwarding table that are generated in step 214, pops up the label value "0x1234" in the packet, and then forwards the packet to the destination address in a form of an IP packet in order to implement complete one-time packet forwarding.

In this application, the forwarding device processes the encapsulated service packet based on the corresponding instruction using the label value, and the instruction also carries the label value. Therefore, a network function is flexibly used using one service label, decoupling between a network and a service is implemented, the network function is easy to use, and a network service is automatically provided.

In this embodiment of this application, the controller obtains the service information, determines at least one forwarding device based on the service information, and then generates an instruction list based on the service information and network function information of the at least one forwarding device. The network function information is used to indicate a network function of the forwarding device, and the instruction list includes a control instruction generated by the controller for the at least one forwarding device. Then, the controller sends the corresponding control instruction in the instruction list to the at least one forwarding device. The control instruction is used by the at least one forwarding device to perform corresponding processing on the service packet. Therefore, the controller may generate the instruction list, and then the controller sends the corresponding control instruction to the at least one forwarding device such that the forwarding device performs corresponding processing on the service packet according to the corresponding control instruction. Therefore, the controller generates the corresponding control instruction using the service information, and then the controller sends the corresponding control instruction to the at least one target forwarding device. The forwarding device may perform corresponding processing on the service packet according to the control instruction, instead of processing the packet based on a fixed explicit path in the packet. This improves packet processing flexibility.

Figure 3A:
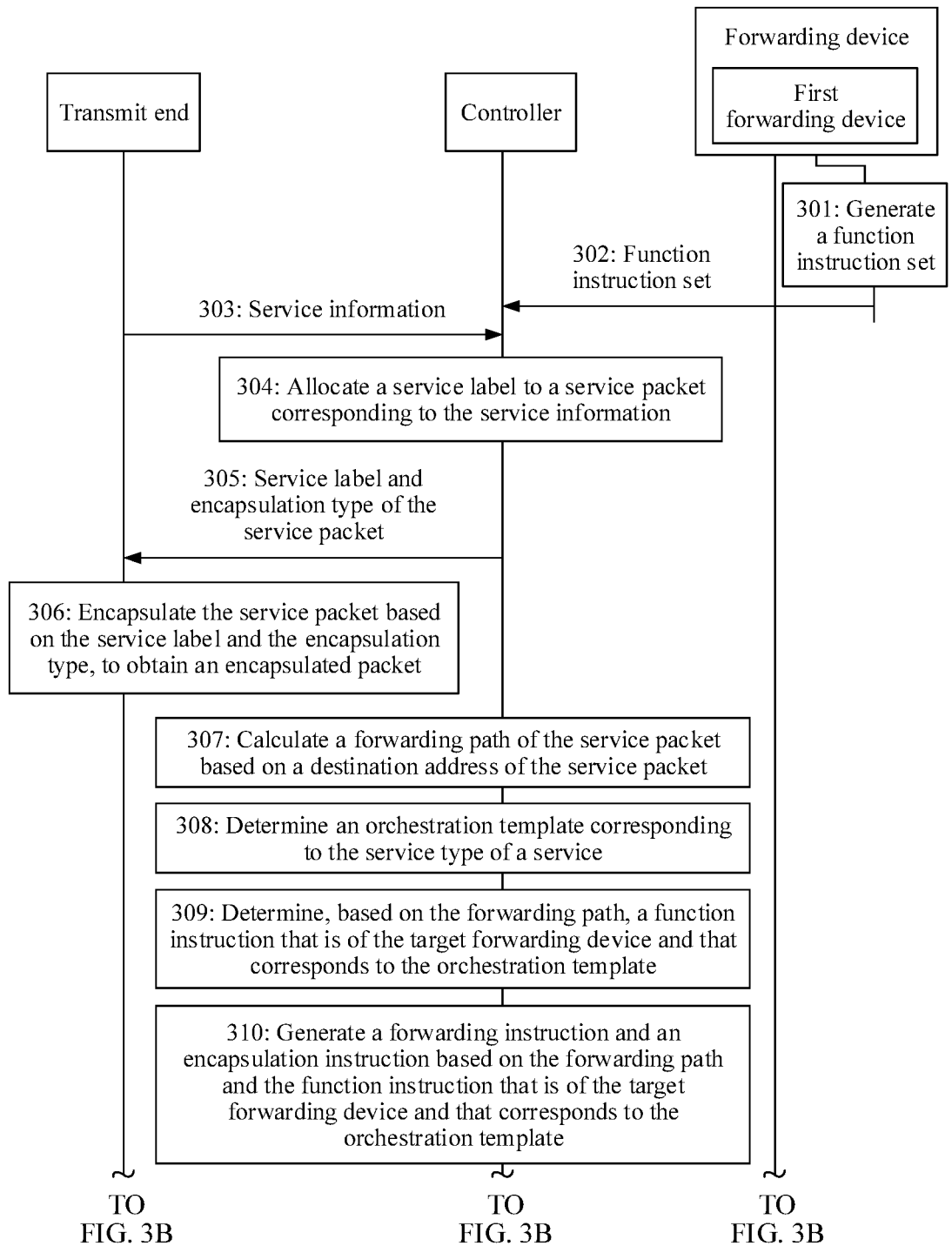
FIG. 3A and FIG. 3B are a schematic diagram of another embodiment of a packet processing method according to an embodiment of this application.
Figure 3B:
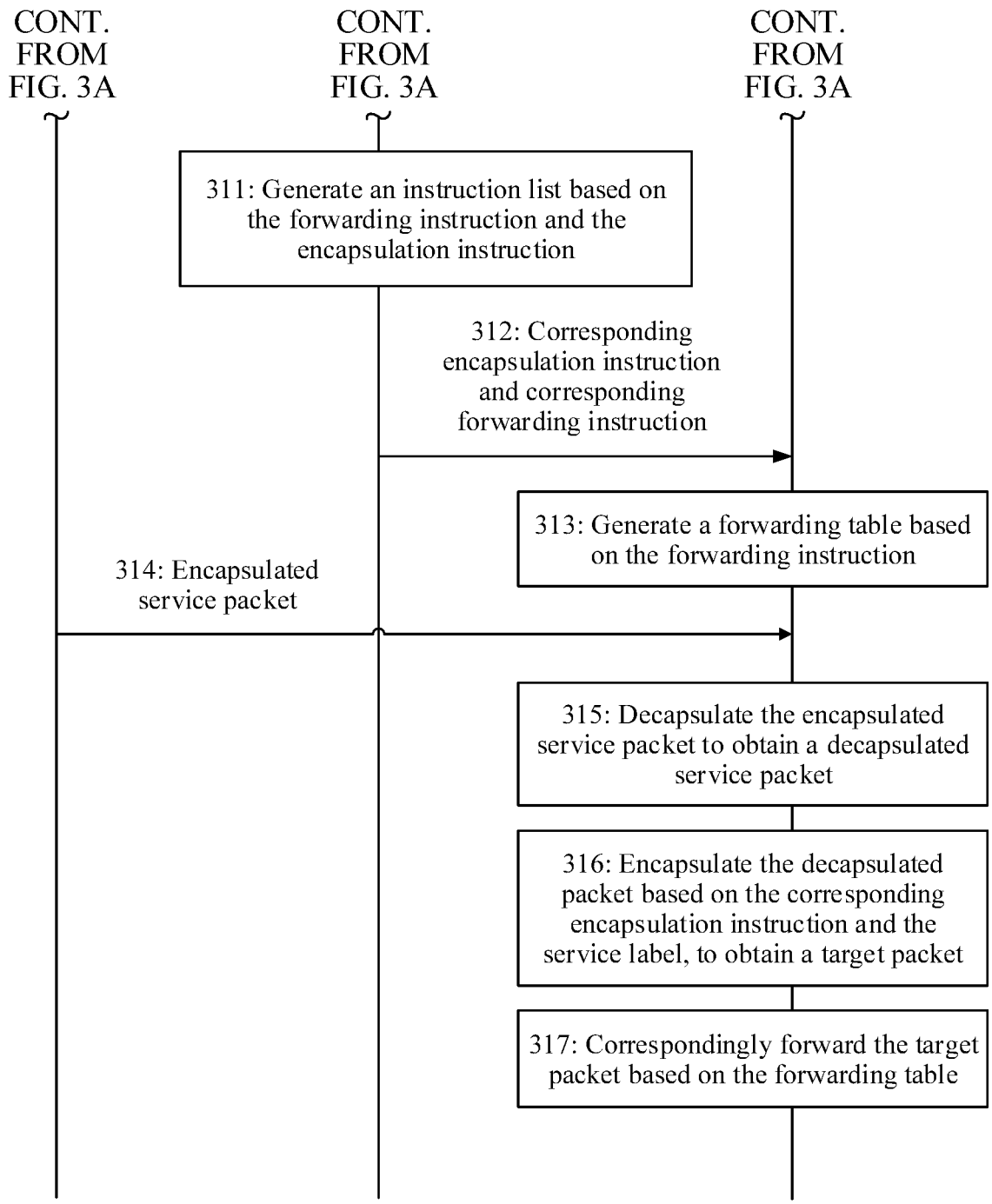

The following describes, using FIG. 3A and FIG. 3B, a process in which the controller correspondingly processes a service packet by delivering a control instruction.

Referring to FIG. 3A and FIG. 3B, in an embodiment in FIG. 3A and FIG. 3B, a controller obtains service information, generates an encapsulation instruction and a forwarding instruction using the service information and network function information of forwarding devices, and then sends the encapsulation instruction and the forwarding instruction to a corresponding forwarding device such that the forwarding device correspondingly encapsulates the service packet and correspondingly forwards an encapsulated service packet according to the forwarding instruction. An embodiment of a data processing method in the embodiments of this application includes the following steps.

301. A forwarding device generates a function instruction set.

302. The forwarding device sends the function instruction set to the controller.

303. A transmit end sends the service information to the controller.

304. The controller allocates a service label to a service corresponding to the service information.

305. The controller sends the service label and an encapsulation type of a service packet corresponding to the service to the transmit end.

306. The transmit end encapsulates, based on the service label and the encapsulation type, the service packet corresponding to the service, to obtain an encapsulated service packet.

307. The controller determines an orchestration template corresponding to a service type of the service.

308. The controller calculates a forwarding path of the service packet based on a destination address of the service packet.

Step 301 to step 308 are similar to step 201 to step 208 in FIG. 2A and FIG. 2B. For detailed descriptions, refer to step 201 to step 208 in FIG. 2A and FIG. 2B. Details are not described herein again.

309. The controller determines, based on the forwarding path, a function instruction that is of the forwarding device and that corresponds to the orchestration template.

After the controller determines the forwarding path of the service packet, the controller determines the function instruction of the forwarding device based on the orchestration template. For example, if the controller determines that the forwarding path of the service packet is A-B-C-D in FIG. 1, the controller may determine, from function instruction sets of A, B, C, and D, that the first forwarding device A has an MPLS encapsulation function, an IP packet encapsulation function, an IP packet forwarding function, and an MPLS packet forwarding function, B, C, and D each have an IP packet forwarding function and an IP packet encapsulation function. Therefore, it is determined, from the orchestration template, that IP packet forwarding needs to be performed on the packet through A, B, C, and D. Because an encapsulation capability of the transmit end is an MPLS encapsulation capability, the packet sent to the first forwarding device A is an MPLS packet. Therefore, the first forwarding device A needs to decapsulate the MPLS packet, and then performs IP packet encapsulation. In this case, the controller may determine that IP packet forwarding function instructions of A, B, C, and D, an IP packet encapsulation function instruction of the first forwarding device A, an MPLS packet forwarding function of the first forwarding device A, and the like are required. It can be learned from Table 2 that, for the IP packet forwarding function instruction, an operation code is "0x90", a packet type is "0x03", and an packet attribute is "Outif+nexthop", and for the IP packet encapsulation function instruction, an operation code is "0x89", a packet type is "0x03", and a packet attribute is "SrcIP+DestIP+ttl+DSCP".

310. The controller generates a forwarding instruction and an encapsulation instruction based on the forwarding path and the function instruction that is of the forwarding device and that corresponds to the orchestration template.

After determining the function instruction of the forwarding device, the controller may generate the corresponding forwarding instruction and encapsulation instruction based on the forwarding path and the function instruction. For example, in step 310, the controller determines the forwarding path A-B-C-D, and an encapsulation function of the transmit end is MPLS packet encapsulation. In an embodiment, when the transmit end sends the service packet to the first forwarding device A, the packet is in a form of an MPLS packet, and the first forwarding device A can identify the MPLS packet. Because B, C, and D can only forward an IP packet, the controller generates an IP packet encapsulation instruction and an IP packet forwarding instruction for the first forwarding device A, and the controller generates corresponding IP packet forwarding instructions for B, C, and D.

311. The controller generates an instruction list based on the forwarding instruction and the encapsulation instruction.

After generating corresponding instructions for all forwarding devices on the forwarding path, the controller generates an instruction list based on the instructions. For example, in step 310, the controller generates an IP packet encapsulation instruction and an IP packet forwarding instruction for A on the forwarding path, and the controller generates corresponding IP packet forwarding instructions for B, C, and D. Therefore, after generating the instructions, the controller generates an instruction list based on the instructions.

312. The controller sends the corresponding encapsulation instruction and the corresponding forwarding instruction to the corresponding first forwarding device.

After generating the corresponding encapsulation instruction and the corresponding forwarding instruction for the first forwarding device, the controller sends the corresponding instructions to the first forwarding device. The first forwarding device is a device having an encapsulation capability and a forwarding capability. For example, in step 310, the controller generates the IP packet encapsulation instruction and the IP packet forwarding instruction for the first forwarding device A such that the controller sends the IP packet encapsulation instruction and the IP packet forwarding instruction in the instruction list to the first forwarding device A, and the controller sends the corresponding IP packet forwarding instructions to B, C, and D.

313. The first forwarding device generates a forwarding table based on the forwarding instruction.

After receiving the forwarding instruction sent by the controller, the first forwarding device obtains, from the forwarding instruction, information such as a type of the service packet, an outbound interface of the packet, and a next hop address for forwarding the service packet, and then generates the forwarding table based on the information. For example, the first forwarding device A may determine, from the IP packet forwarding instruction, that the packet type is the IP packet, the outbound interface is the forwarding device D, and the next hop address of the packet is the forwarding device B.

314. The transmit end sends the encapsulated service packet to the first forwarding device.

After encapsulating the service packet, the transmit end sends the encapsulated service packet to the first forwarding device. For example, if the controller determines, in step 310, that the forwarding path of the service packet is A-B-C-D, the transmit end sends the encapsulated service packet to the first forwarding device A.

315. The first forwarding device decapsulates the encapsulated service packet to obtain a decapsulated service packet.

After receiving the encapsulated service packet, the first forwarding device first decapsulates the encapsulated service packet to obtain the decapsulated service packet. For example, after receiving the MPLS packet sent by the transmit end, the first forwarding device A decapsulates the MPLS packet.

316. The first forwarding device encapsulates the decapsulated service packet based on the corresponding encapsulation instruction and the service label, to obtain a target packet.

After decapsulating the encapsulated service packet, the first forwarding device correspondingly encapsulates the decapsulated service packet based on the encapsulation instruction sent by the controller and a service label at an outer layer in the service packet sent by the transmit end, to obtain the target packet. For example, after decapsulating the MPLS packet, the first forwarding device encapsulates the decapsulated packet into the IP packet based on the received IP packet encapsulation instruction and a label value at an outer layer in the MPLS packet. After generating the forwarding path of the packet, the controller correspondingly delivers an instruction based on a network function of each forwarding device on the forwarding path in order to successfully forward the packet.

317. The first forwarding device correspondingly forwards the target packet based on the forwarding table.

After generating the forwarding table, the first forwarding device correspondingly forwards the target packet based on the forwarding table. For example, after the first forwarding device A encapsulates the service packet into the IP packet, the first forwarding device A forwards the IP packet to the target forwarding device B based on the forwarding table generated based on the IP packet forwarding instruction, the forwarding device B forwards the IP packet to the forwarding device C according to the IP packet forwarding instruction sent by the controller, and then the forwarding device D forwards the IP packet to the destination address according to the IP packet forwarding instruction in order to complete one-time packet forwarding.

In this embodiment of this application, the controller may determine that the packet of the target service is a multicast packet, and then deliver at least two forwarding instructions to implement multicast forwarding. Details are described below using FIG. 4A and FIG. 4B.

Figure 4A:
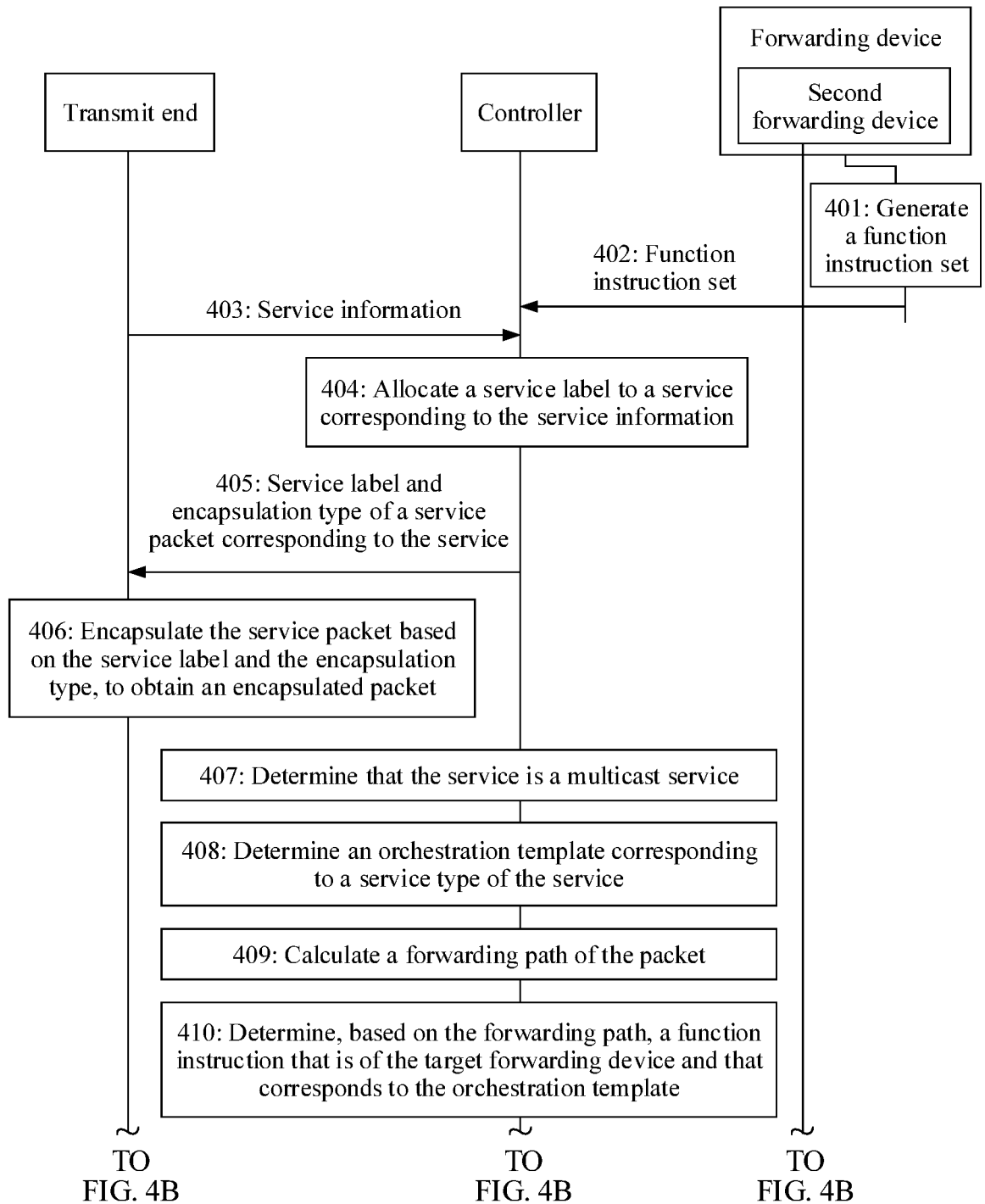
FIG. 4A and FIG. 4B are a schematic diagram of another embodiment of a packet processing method according to an embodiment of this application.
Figure 4B:
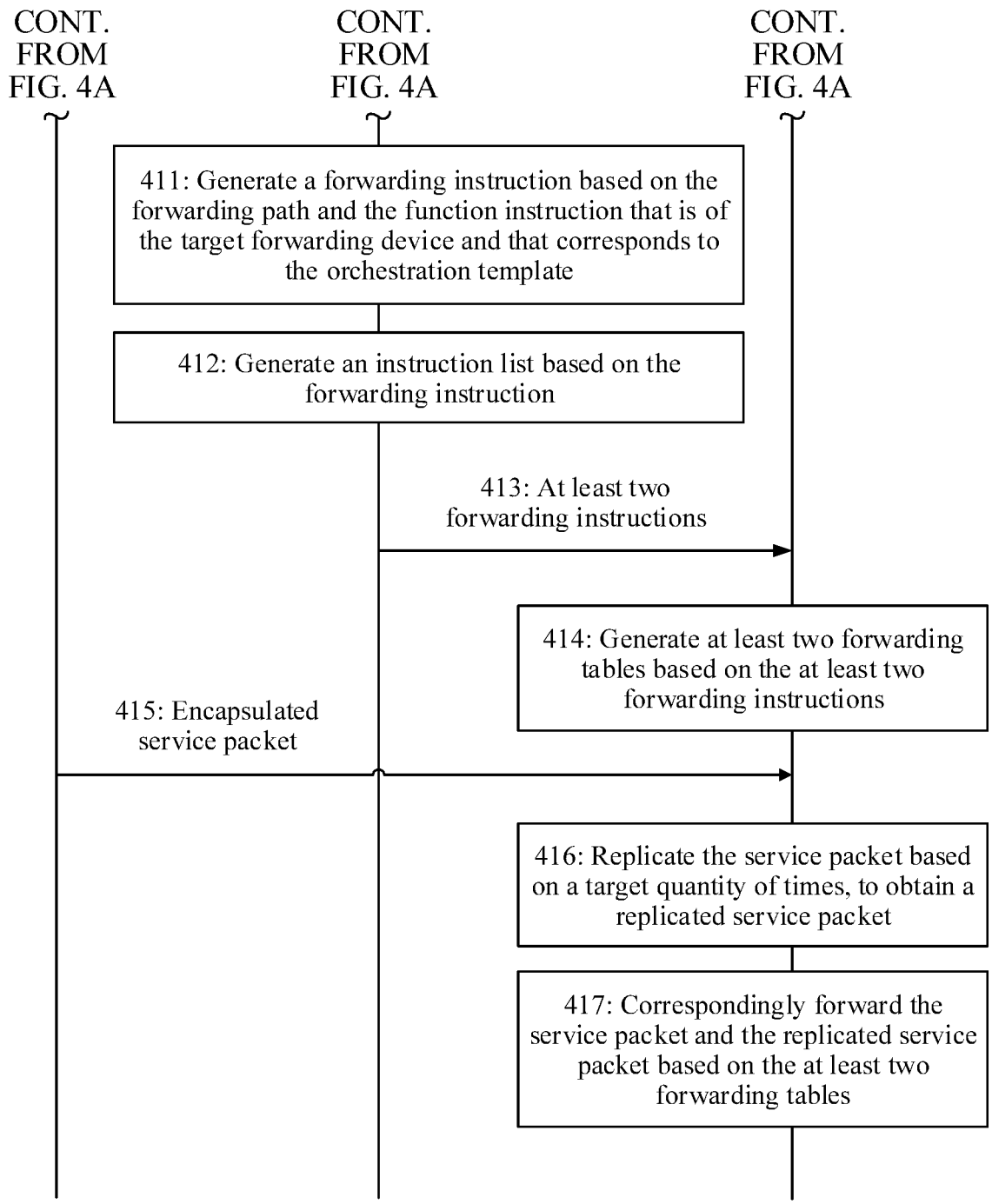

Referring to FIG. 4A and FIG. 4B, in an embodiment in FIG. 4A and FIG. 4B, the controller determines that the service is a multicast service, and then delivers the at least two forwarding instructions to process the multicast service. Another embodiment of a data processing method in the embodiments of this application includes the following steps.

401. A forwarding device generates a function instruction set.

402. The forwarding device sends the function instruction set to the controller.

403. A transmit end sends service information to the controller.

404. The controller allocates a service label to a service corresponding to the service information.

405. The controller sends the service label and an encapsulation type of a service packet corresponding to the service to the transmit end.

406. The transmit end encapsulates the service packet based on the service label and the encapsulation type of the service packet, to obtain an encapsulated packet.

Step 401 to step 406 are similar to step 201 to step 206 in FIG. 2A and FIG. 2B. For detailed descriptions, refer to step 201 to step 206 in FIG. 2A and FIG. 2B. Details are not described herein again.

407. The controller determines that the service is a multicast service.

The controller may determine that the service is a multicast service. Specifically, the controller may determine, using a multicast node of the service packet included in the service information, that the service is a multicast service, or the controller may determine, through detection, a plurality of receive ends that request the service packet in order to determine that the service is a multicast service. This is not specifically limited herein.

408. The controller determines an orchestration template corresponding to a service type of the service.

Step 408 is similar to step 207 in FIG. 2A and FIG. 2B. Details are not described herein again.

409. The controller calculates a forwarding path of the packet.

Figure 5:
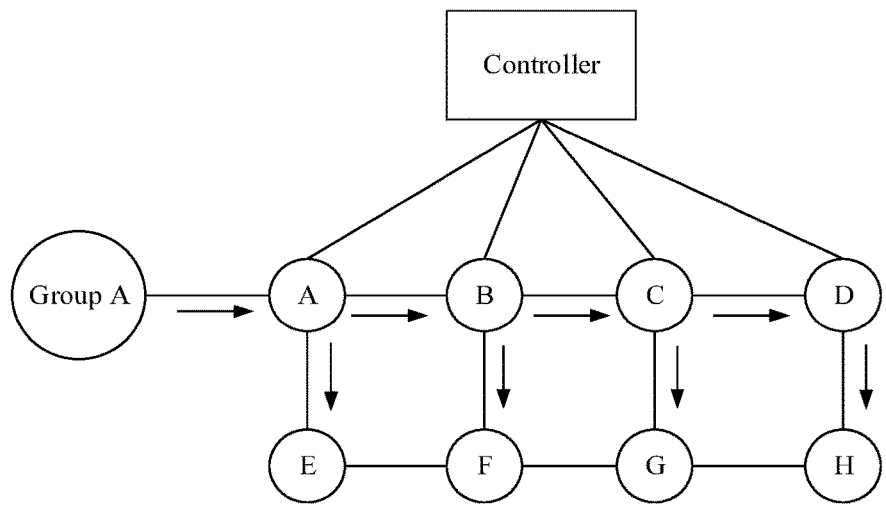
FIG. 5 is a schematic diagram of a scenario of a packet processing method according to an embodiment of this application.

After determining that the service is a multicast service, the controller may calculate, based on related information of the multicast service, the forwarding path of the packet corresponding to the multicast service. The controller determines a forwarding device based on the forwarding path. The forwarding device includes a second forwarding device, and the second forwarding device is a device having a packet replication function and a packet forwarding function. Specifically, the controller may determine a multicast node using the service information, and then calculate a corresponding forwarding path according to an algorithm. Alternatively, the controller may determine addresses of a plurality of receive ends of the packet corresponding to the multicast service, and then calculate a corresponding forwarding path according to an algorithm. For example, in FIG. 5, the controller determines that the service is a multicast service, and obtains, through calculation, four forwarding paths of the packet corresponding to the multicast service, which are specifically A-B-C-D-H, A-E, A-B-F, and A-B-C-G. In this case, the controller may determine A, B, C, and D as multicast junctions.

410. The controller determines, based on the forwarding path, a function instruction that is of the forwarding device and that corresponds to the orchestration template.

After determining the forwarding path, the controller determines the function instruction that is of the forwarding device and that corresponds to the orchestration template. For example, if the controller determines that the forwarding paths of the packet corresponding to the multicast service are A-E, A-B-F, A-B-C-G, and A-B-C-D-H, the controller determines function instructions that are in A, B, C, D, E, F, and G and that correspond to network function requirements described in the orchestration template, and the controller determines that A, B, C, D, E, F, G, and H each have an MPLS packet forwarding function instruction and the function instruction is required during current forwarding. It can be learned from Table 2 that, for the MPLS packet forwarding function instruction, an operation code is "0x90", a packet type is "0x04", and an encapsulation attribute is "Outif+nexthop+outlabel".

411. The controller generates a forwarding instruction based on the forwarding path and the function instruction that is of the forwarding device and that corresponds to the orchestration template.

After determining the forwarding path, the controller generates the forwarding instruction based on the function instruction of the forwarding device. Specifically, in step 410, the controller learns, through calculation, that the forwarding paths of the packet corresponding to the multicast service are A-E, A-B-F, A-B-C-G, and A-B-C-D-H, and the controller determines MPLS packet forwarding instructions of A, B, C, D, E, F, and G. Therefore, for the second forwarding device A, the controller needs to generate two forwarding instructions. One forwarding instruction is an MPLS packet forwarding instruction for forwarding the packet corresponding to the multicast service to B, and the other forwarding instruction is an MPLS packet forwarding instruction for forwarding the packet corresponding to the multicast service to E. Details are shown in Table 10. In an embodiment, the controller generates the two MPLS packet forwarding instructions for the second forwarding device A.

TABLE 10

| Forwarding action | | |
| --- | --- | --- |
| 0x90 | 0x04 | Outif + nexthop B + outlabel 0x1234 |
| 0x90 | 0x04 | Outif + nexthop E + outlabel 0x1234 |

The controller generates two MPLS packet forwarding instructions for the forwarding device B. One forwarding instruction is an MPLS packet forwarding instruction for forwarding the packet corresponding to the multicast service to C, and the other forwarding instruction is an MPLS packet forwarding instruction for forwarding the packet corresponding to the multicast service to F. Details are specifically shown in Table 11. In an embodiment, the controller generates the two MPLS packet forwarding instructions for the forwarding device B.

TABLE 11

| Forwarding action | | |
|---|---|---|
| 0x90 | 0x04 | Outif + nexthop C + outlabel 0x1234 |
| 0x90 | 0x04 | Outif + nexthop F + outlabel 0x1234 |

The controller generates two MPLS packet forwarding instructions for the forwarding device C. One forwarding instruction is an MPLS packet forwarding instruction for forwarding the packet corresponding to the multicast service to D, and the other forwarding instruction is an MPLS packet forwarding instruction for forwarding the packet corresponding to the multicast service to G. Details are shown in Table 12. In an embodiment, the controller generates the two MPLS packet forwarding instructions for the forwarding device C.

TABLE 12

| Forwarding action | | |
|---|---|---|
| 0x90 | 0x04 | Outif + nexthop D + outlabel 0x1234 |
| 0x90 | 0x04 | Outif + nexthop G + outlabel 0x1234 |

The controller generates one MPLS packet forwarding instruction for the forwarding device D, and forwards the packet corresponding to the multicast service to the forwarding device G. Details are shown in Table 13. In an embodiment, the controller generates the MPLS packet forwarding instruction for the forwarding device D.

TABLE 13

| Forwarding action | | |
|---|---|---|
| 0x90 | 0x04 | Outif + nexthop H + outlabel 0x1234 |

412. The controller generates an instruction list based on the forwarding instruction.

After generating corresponding forwarding instructions for all forwarding devices on each forwarding path, the controller generates an instruction list based on these forwarding instructions. For example, the controller generates the instruction list based on the generated forwarding instruction in step 411.

413. The controller sends the at least two forwarding instructions to the second forwarding device.

After generating the corresponding forwarding instruction for each forwarding device on each forwarding path, the controller sends the at least two forwarding instructions to the second forwarding device. The second forwarding device is a device having a packet replication function and a forwarding function. For example, in the instruction list in step 412, the controller sends the two forwarding instructions to the second forwarding device A, and the controller sends the two forwarding instructions to the second forwarding device B.

414. The second forwarding device generates at least two forwarding tables based on the at least two forwarding instructions.

After receiving the at least two forwarding instructions, the second forwarding device generates the corresponding forwarding table based on the forwarding instruction. For example, if the second forwarding device A receives two forwarding instructions, the second forwarding device A generates two corresponding forwarding tables based on the two forwarding instructions.

415. The transmit end sends the encapsulated service packet to the second forwarding device.

The transmit end encapsulates the service packet based on the corresponding encapsulation type using the service label allocated by the controller, and then sends the encapsulated packet to the second forwarding device.

416. The second forwarding device replicates the service packet based on a target quantity of times, to obtain a replicated packet.

After the second forwarding device generates the two corresponding forwarding tables based on the at least two forwarding instructions, the second forwarding device receives the encapsulated service packet sent by the transmit end. Because the second forwarding device needs to forward the encapsulated packet at least twice, the second forwarding device replicates the packet based on the target quantity of times, to obtain replicated packets. The target quantity of times is less than a quantity of the at least two forwarding instructions by 1. A quantity of times that the second forwarding device forwards the packet is consistent with a quantity of forwarding instructions received by the second forwarding device, and a quantity of packets that need to be forwarded is the quantity of forwarding instructions received by the second forwarding device. Therefore, the target quantity of times is less than the quantity of forwarding instructions received by the second forwarding device by 1. For example, if the second forwarding device A receives two forwarding instructions, the second forwarding device A replicates the packet once.

417. The second forwarding device correspondingly forwards the service packet and the replicated service packet based on the at least two forwarding tables.

After replicating the service packet, the second forwarding device correspondingly forwards the service packet based on the forwarding table. For example, the second forwarding device A replicates the service packet once to obtain a replicated packet and the packet, and then forwards the service packets according to the two received forwarding instructions. Therefore, this application is also applicable to forwarding of a packet of a multicast service, and the packet of the multicast service may be an encrypted packet or an ordinary packet. This improves practicability of the solution.

In this embodiment of this application, in a process in which the controller delivers the control instruction to the forwarding device and the forwarding device performs a corresponding operation, after the service packet is encapsulated in the embodiment in FIG. 3A and FIG. 3B, multicast forwarding may be performed on the service packet with reference to the embodiment in FIG. 4A and FIG. 4B. In an embodiment, in this application, in a process of processing the service packet, the controller may deliver an encapsulation instruction to a corresponding forwarding device. After the forwarding device correspondingly encapsulates the service packet, the forwarding device performs corresponding multicast forwarding on the service packet according to a multicast forwarding instruction delivered by the controller. Alternatively, information such as a packet loss rate of the service packet may be measured in a process of forwarding the service packet. Therefore, in an embodiment of this application, the controller may deliver the corresponding control instruction to process the service packet with reference to an actual situation. This is not limited in this application.

Figure 6:
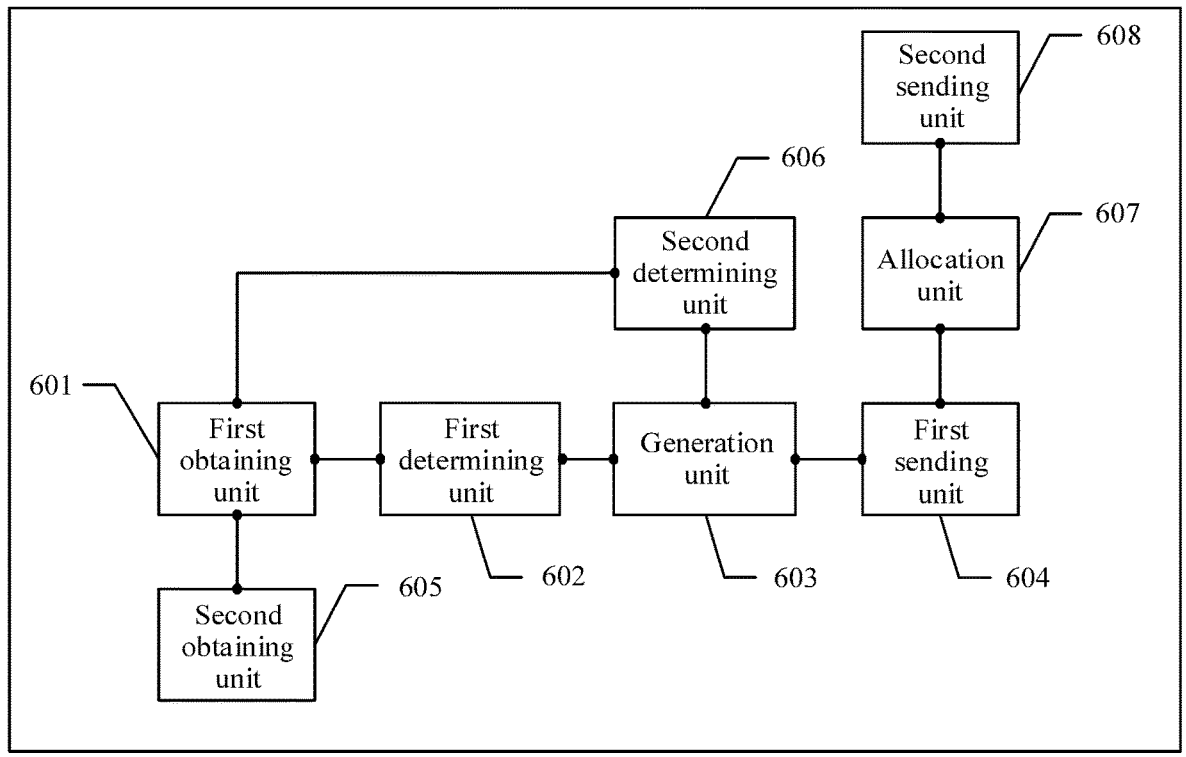
FIG. 6 is a schematic structural diagram of a controller according to an embodiment of this application.

FIG. 6 is a possible schematic structural diagram of the controller in the foregoing embodiments. The controller 600 may implement functions of the controller in the embodiments shown in FIG. 2A and FIG. 2B, FIG. 3A and FIG. 3B, and FIG. 4A and FIG. 4B. Referring to FIG. 6, the controller 600 includes a first obtaining unit 601, a first determining unit 602, a generation unit 603, a first sending unit 604, a second obtaining unit 605, a second determining unit 606, an allocation unit 607, and a second sending unit 608. These units may perform corresponding functions of the controller in the foregoing method embodiments. The first obtaining unit 601 is configured to support the controller 600 in performing the process 203 in FIG. 2A and FIG. 2B, the process 303 in FIG. 3A and FIG. 3B, and the process 403 in FIG. 4A and FIG. 4B. The first determining unit 602 is configured to support the process 208 in FIG. 2A and FIG. 2B, the process 307 in FIG. 3A and FIG. 3B, and the process 409 in FIG. 4A and FIG. 4B. The generation unit 603 is configured to support the controller 600 in performing the processes 207, 209, and 210 in FIG. 2A and FIG. 2B, the processes 308, 309, 310, and 311 in FIG. 3A and FIG. 3B, and the processes 408, 410, 411, and 412 in FIG. 4A and FIG. 4B. The first sending unit 604 is configured to support the process 212 in FIG. 2A and FIG. 2B, the process 312 in FIG. 3A and FIG. 3B, and the process 413 in FIG. 4A and FIG. 4B. The second obtaining unit 605 is configured to support the process 202 in FIG. 2A and FIG. 2B, the process 302 in FIG. 3A and FIG. 3B, and the process 403 in FIG. 4A and FIG. 4B. The second determining unit 606 is configured to support the process 407 in FIG. 4A and FIG. 4B. The allocation unit 607 is configured to support the process 204 in FIG. 2A and FIG. 2B, the process 304 in FIG. 3A and FIG. 3B, and the process 404 in FIG. 4A and FIG. 4B. The second sending unit 608 is configured to support the process 205 in FIG. 2A and FIG. 2B, the process 305 in FIG. 3A and FIG. 3B, and the process 405 in FIG. 4A and FIG. 4B. These units may perform other processes performed by the controller in the technology described in this specification. For example, the first obtaining unit 601 is configured to perform receiving of service information that is performed by the controller in the foregoing method embodiments, the first determining unit 602 is configured to perform determining of a forwarding device that is performed by the controller based on the service information in the foregoing method embodiments, and the generation unit 603 is configured to perform generation of an instruction list that is performed by the controller based on the service information and network function information of the at least one forwarding device in the foregoing method embodiments. For a specific execution process, refer to the foregoing detailed descriptions of corresponding steps in the embodiment shown in FIG. 2A and FIG. 2B, FIG. 3A and FIG. 3B, or FIG. 4A and FIG. 4B. Details are not described herein again.

Figure 7:
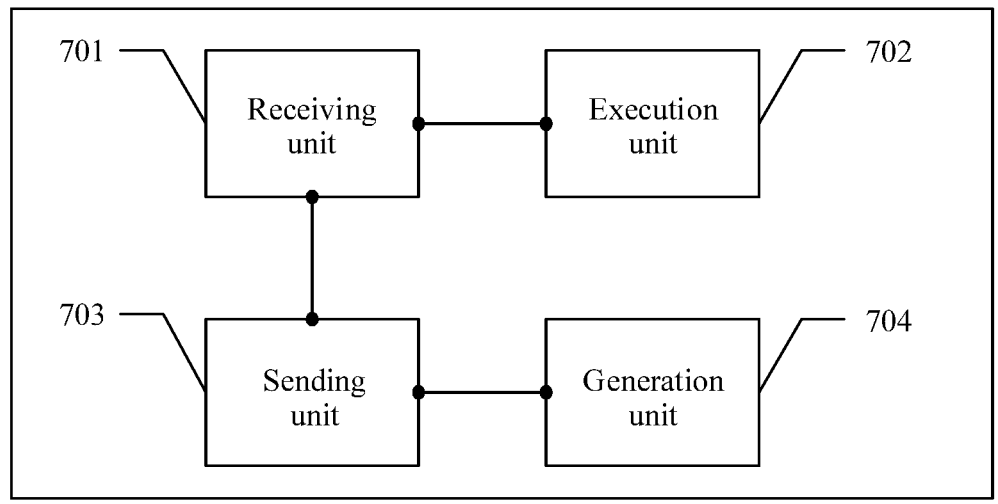
FIG. 7 is a schematic structural diagram of a forwarding device according to an embodiment of this application.

FIG. 7 is a possible schematic structural diagram of the forwarding device in the foregoing embodiments. The forwarding device 700 may implement functions of the forwarding device in the embodiment shown in FIG. 2A and FIG. 2B, FIG. 3A and FIG. 3B, or FIG. 4A and FIG. 4B. Referring to FIG. 7, the forwarding device 700 includes a receiving unit 701, an execution unit 702, a sending unit 703, and a generation unit 704. These units may perform corresponding functions of the forwarding device in the foregoing method embodiments. The receiving unit 701 is configured to support the process 212 in FIG. 2A and FIG. 2B, the process 312 in FIG. 3A and FIG. 3B, and the process 413 in FIG. 4A and FIG. 4B. The execution unit 702 is configured to support the processes 213 and 215 in FIG. 2A and FIG. 2B, the processes 313, 315, 316, and 317 in FIG. 3A and FIG. 3B, and the processes 414, 416, and 417 in FIG. 4A and FIG. 4B. The sending unit 703 is configured to support the process 202 in FIG. 2A and FIG. 2B, the process 302 in FIG. 3A and FIG. 3B, and the process 402 in FIG. 4A and FIG. 4B. The generation unit 704 is configured to support the process 201 in FIG. 2A and FIG. 2B, the process 301 in FIG. 3A and FIG. 3B, and the process 401 in FIG. 4A and FIG. 4B. Additionally/Alternatively, these units may perform other processes performed by the controller in the technology described in this specification. For example, the receiving unit 701 is configured to receive a control instruction sent by the controller, the execution unit 702 is configured to perform a corresponding operation according to the control instruction, and the sending unit 703 is configured to send a function instruction set to the controller. For a specific execution process, refer to the foregoing detailed descriptions of corresponding steps in the embodiment shown in FIG. 2A and FIG. 2B, FIG. 3A and FIG. 3B, or FIG. 4A and FIG. 4B. Details are not described herein again.

Figure 8:
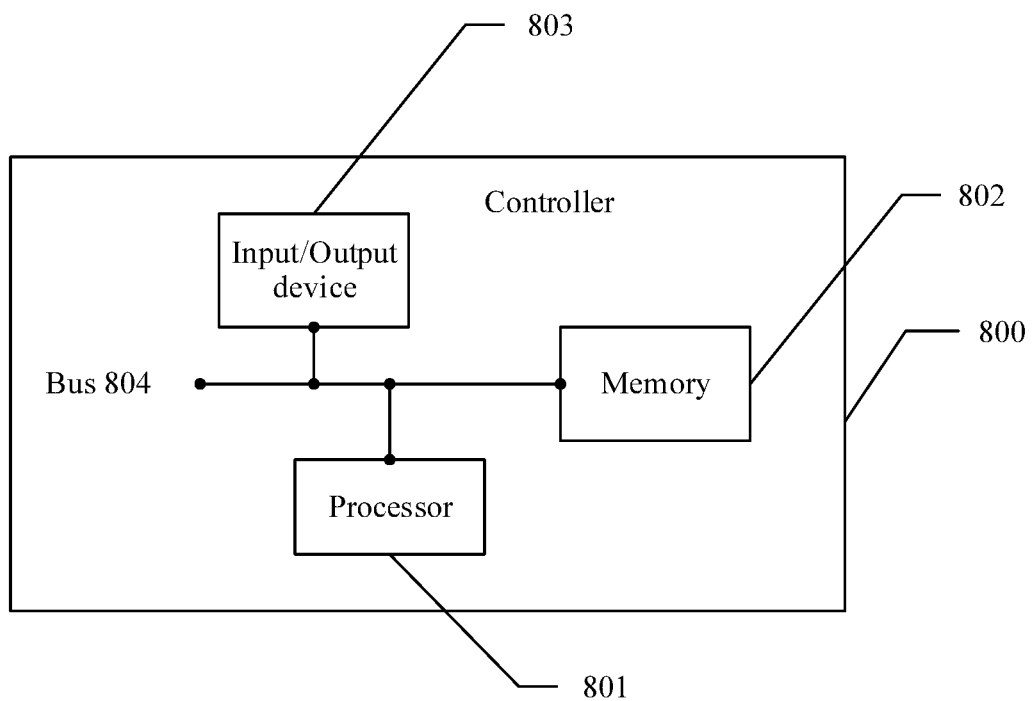
FIG. 8 is another schematic structural diagram of a controller according to an embodiment of this application.

FIG. 8 is a possible schematic structural diagram of the controller in the foregoing embodiments. Referring to FIG. 8, the controller 800 includes a processor 801, a memory 802, an input/output device 803, and a bus 804. The processor 801, the input/output device 803, and the memory 802 are connected to each other using the bus 804. The bus 804 may be a Peripheral Component Interconnect (PCI) bus, an Extended Industry Standard Architecture (EISA) bus, or the like. The bus 804 may be classified into an address bus, a data bus, a control bus, and the like. For ease of representation, only one thick line is used to represent the bus in FIG. 8, but this does not mean that there is only one bus or only one type of bus. The controller may implement functions of the controller in the embodiment shown in FIG. 2A and FIG. 2B, FIG. 3A and FIG. 3B, or FIG. 4A and FIG. 4B. The processor 801 and the input/output device 803 may perform corresponding functions of the controller in the foregoing method examples. The input/output device 803 is configured to support execution of the processes 202, 203, 205, and 212 in FIG. 2A and FIG. 2B, the processes 302, 303, 305, and 312 in FIG. 3A and FIG. 3B, and the processes 402, 403, 405, and 413 in FIG. 4A and FIG. 4B. The processor 801 is configured to support the controller 800 in performing the processes 204, 207, 208, 209, 210, and 211 in FIG. 2A and FIG. 2B, the processes 304, 307, 308, 309, 310, and 311 in FIG. 3A and FIG. 3B, the processes 404, 407, 408, 409, 410, 411, and 412 in FIG. 4A and FIG. 4B, and/or other processes performed by the controller 800 in the technology described in this specification. The memory 802 is configured to store program code and data of the controller. For a specific execution process, refer to the foregoing detailed descriptions of corresponding steps in the embodiment shown in FIG. 2A and FIG. 2B, FIG. 3A and FIG. 3B, or FIG. 4A and FIG. 4B. Details are not described herein again.

Figure 9:
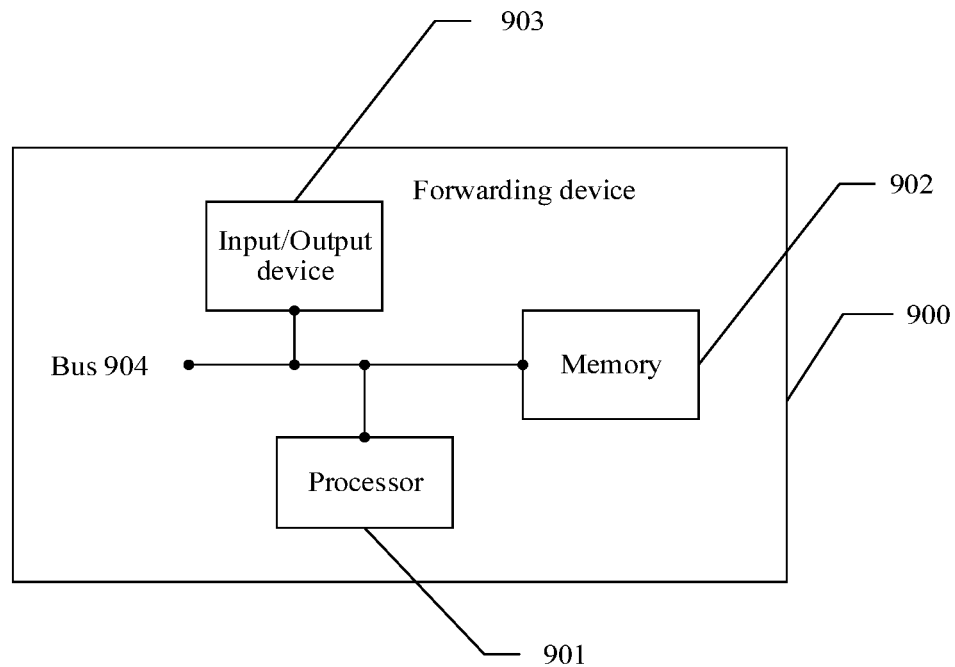
FIG. 9 is another schematic structural diagram of a forwarding device according to an embodiment of this application.

FIG. 9 is a possible schematic structural diagram of the forwarding device in the foregoing embodiments. Referring to FIG. 9, the forwarding device includes a processor 901, a memory 902, an input/output device 903, and a bus 904. The processor 901, the input/output device 903, and the memory 902 are connected to each other using the bus 904. The bus 904 may be a PCI bus, an EISA bus, or the like. The bus 904 may be classified into an address bus, a data bus, a control bus, and the like. For ease of representation, only one thick line is used to represent the bus in FIG. 9, but this does not mean that there is only one bus or only one type of bus. The forwarding device 900 may implement functions of the forwarding device in the embodiment shown in FIG. 2A and FIG. 2B, FIG. 3A and FIG. 3B, or FIG. 4A and FIG. 4B. The processor 901 and the input/output device 903 may perform corresponding functions of the forwarding device in the foregoing method examples. The processor 901 is configured to support the processes 201, 213, and 215 in FIG. 2A and FIG. 2B, the processes 301, 313, 315, 316, and 317 in FIG. 3A and FIG. 3B, and the processes 401, 414, 416, and 417 in FIG. 4A and FIG. 4B. The input/output device 903 is configured to support the processes 202, 212, and 214 in FIG. 2A and FIG. 2B, the processes 302, 312, and 314 in FIG. 3A and FIG. 3B, the processes 402, 413, and 415 in FIG. 4A and FIG. 4B, and/or other processes performed by the forwarding device 900 in the technology described in this specification. The memory 902 is configured to store program code and data of the controller. For a specific execution process, refer to the foregoing detailed descriptions of corresponding steps in the embodiment shown in FIG. 2A and FIG. 2B, FIG. 3A and FIG. 3B, or FIG. 4A and FIG. 4B. Details are not described herein again.

Figure 10:
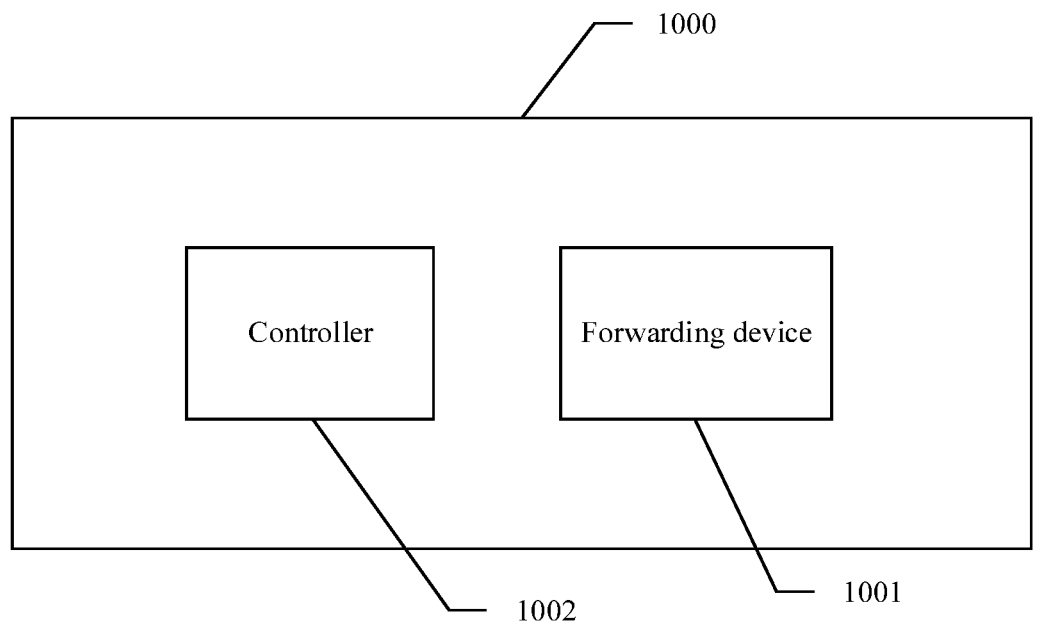
FIG. 10 is a schematic diagram of a packet processing system according to an embodiment of this application.

Referring to FIG. 10, an embodiment of the present disclosure provides a packet processing system 1000. The system 1000 is configured to implement the packet processing methods in the foregoing method embodiments. The system 1000 includes a controller 1002 and a forwarding device 1001. The controller 1002 and the forwarding device 1001 may respectively implement functions of the controller and the forwarding device in the embodiment shown in FIG. 2A and FIG. 2B, FIG. 3A and FIG. 3B, or FIG. 4A and FIG. 4B. For example, the controller 1002 performs the processes 202, 203, 204, 205, 207, 208, 209, 210, 211, and 212 in FIG. 2A and FIG. 2B, the processes 302, 303, 304, 305, 307, 308, 309, 310, 311, and 312 in FIG. 3A and FIG. 3B, the processes 402, 403, 404, 405, 407, 408, 409, 410, 411, 412, and 413 in FIG. 4A and FIG. 4B, and/or other processes performed by the controller 1002 in the technology described in this specification. The forwarding device 1001 performs the processes 201, 202, 213, 214, and 215 in FIG. 2A and FIG. 2B, the processes 301, 302, 312, 313, 314, 315, 316, and 317 in FIG. 3A and FIG. 3B, the processes 401, 402, 413, 414, 415, 416, and 417 in FIG. 4A and FIG. 4B, and/or other processes performed by the forwarding device in the technology described in this specification.

In another possible design, when the controller or the forwarding device is a chip in a terminal, the chip includes a processing unit and a communications unit. The processing unit may be, for example, a processor. The communications unit may be, for example, an input/output interface, a pin, or a circuit. The processing unit may execute a computer-executable instruction stored in a storage unit such that the chip in the terminal performs the packet processing method in any implementation in the first aspect or the second aspect. Optionally, the storage unit is a storage unit in the chip, such as a register or a buffer, or the storage unit may be a storage unit in the terminal but outside the chip, such as a read-only memory (ROM), another type of static storage device capable of storing static information and an instruction, or a random-access memory (RAM).

The processor mentioned above may be a central processing unit (CPU), a general purpose processor, a digital signal processor (DSP), an application-specific integrated circuit (ASIC), a field-programmable gate array (FPGA) or another programmable logic device, a transistor logic device, a hardware component, or any combination thereof. The processor may implement or execute various example logical blocks, modules, and circuits described with reference to content disclosed in the embodiments of the present disclosure. The processor may alternatively be a combination of processors implementing a computing function, for example, a combination of one or more microprocessors, or a combination of a DSP and a microprocessor.

All or some of the foregoing embodiments may be implemented through software, hardware, firmware, or any combination thereof. When the software is used to implement the embodiments, all or some of the embodiments may be implemented in a form of a computer program product.

The computer program product includes one or more computer instructions. When the computer program instructions are loaded and executed on a computer, the procedures or functions according to the embodiments of the present disclosure are all or partially generated. The computer may be a general purpose computer, a special purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

In the several embodiments provided in this application, it should be understood that the disclosed system, apparatus, and method may be implemented in another manner. For example, the described apparatus embodiment is merely an example. For example, the unit division is merely logical function division and may be other division in an embodiment. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to other approaches, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The objectives, technical solutions, and benefits of the present disclosure are further described in detail in the foregoing specific implementations. It should be understood that the foregoing descriptions are merely specific implementations of the present disclosure, but are not intended to limit the protection scope of the present disclosure. Any modification, equivalent replacement, or improvement made within the spirit and principle of the present disclosure shall fall within the protection scope of the present disclosure.

What is claimed is:

1. A packet processing method, implemented by a controller, wherein the method comprises:
    obtaining, from a transmitting device, service information comprising a service type of a service and an encapsulation capability of the transmit device;
    determining at least one forwarding device based on the service information;
    generating an instruction list based on the service information and network function information of the at least one forwarding device, wherein the network function information indicates a network function of the at least one forwarding device that comprises the encapsulation capability and a forwarding capability of the at least one forwarding device, and wherein the instruction list comprises a control instruction for the at least one forwarding device that instructs the at least one forwarding device to perform network function processing on a service packet of the service corresponding to the service information according to the encapsulation capability and the forwarding capability of the at least one forwarding device; and
    sending the control instruction to the at least one forwarding device.

2. The method of claim 1, wherein before generating the instruction list, the method further comprises obtaining the network function information from the at least one forwarding device.

3. The method of claim 1, wherein the network function information comprises a function instruction set from the at least one forwarding device to the controller.

4. The method of claim 1, wherein the service information comprises a destination address of the service, wherein determining the at least one forwarding device comprises calculating a forwarding path corresponding to the service packet based on the destination address, and wherein the at least one forwarding device is a device on the forwarding path.

5. The method of claim 4, wherein generating the instruction list comprises generating the instruction list based on the service information, the forwarding path, and the network function information.

6. The method of claim 5, wherein the service information comprises the service type of the service, and wherein generating the instruction list comprises:
    determining an orchestration template corresponding to the service type and used to indicate a network function requirement corresponding to the service type; and
    generating the instruction list based on the forwarding path, the orchestration template, and the network function information, wherein the instruction list comprises a forwarding instruction generated by the controller for the at least one forwarding device.

7. The method of claim 6, wherein the control instruction comprises the forwarding instruction, wherein the at least one forwarding device comprises a packet forwarding function, and wherein generating the instruction list comprises:
    determining the network function information of the at least one forwarding device and corresponding to the orchestration template;
    generating the forwarding instruction based on the forwarding path and the network function information of the at least one forwarding device and corresponding to the orchestration template; and
    generating the instruction list based on the forwarding instruction.

8. The method of claim 1, wherein the control instruction comprises a forwarding instruction, wherein after obtaining the service information and before generating the instruction list, the method further comprises determining the service is a multicast service.

9. The method of claim 8, wherein sending the control instruction comprises sending at least two forwarding instructions in the instruction list to one of the at least one forwarding device comprising a replication function, wherein the at least two forwarding instructions instruct one of the at least one forwarding device having the replication function to replicate and forward the service packet of the multicast service.

10. A packet processing method, implemented by a forwarding device, wherein the method comprises:
    receiving a control instruction from a controller based on service information of a transmitting device and network function information of the forwarding device, wherein the service information comprises an encapsulation capability of the transmitting device, and wherein the network function information indicates a network function of the forwarding device comprising the encapsulation capability and a forwarding capability of the forwarding device; and
    performing, according to the control instruction, a corresponding operation on a service packet of a service according to the encapsulation capability and the forwarding capability of the forwarding device that corresponds to the service information.

11. The method of claim 10, wherein before receiving the control instruction, the method further comprises sending the network function information to the controller.

12. The method of claim 11, wherein before sending the network function information to the controller, the method further comprises generating a network function instruction that indicates the network function of the forwarding device, and wherein the network function instruction corresponds to one or more network functions, and wherein sending the network function information to the controller comprises sending the network function instruction to the controller.

13. The method of claim 10, wherein the forwarding device comprises a forwarding function, a packet replication function and the forwarding function, or a corresponding encapsulation function and the forwarding function.

14. The method of claim 10, wherein the service is a multicast service, wherein the control instruction comprises a forwarding instruction, wherein the forwarding device comprises a packet replication function and a forwarding function, and wherein receiving the control instruction comprises receiving at least two forwarding instructions from the controller.

15. The method of claim 14, wherein performing the corresponding operation on the service packet comprises:

replicating the service packet to obtain a replicated service packet based on a target quantity of times less than a quantity of the at least two forwarding instructions by one; and forwarding the service packet and the replicated service packet according to the at least two forwarding instructions.

16. The method of claim 14, wherein performing the corresponding operation on the service packet comprises:

generating a forwarding table based on the forwarding instruction; and forwarding the service packet based on the forwarding table.

17. A forwarding device, comprising:

a receiver configured to receive a control instruction from a controller based on service information of a transmitting device and network function information of the forwarding device, wherein the service information comprises an encapsulation capability of the transmitting device, and wherein the network function information indicates a network function of the forwarding device comprising the encapsulation capability and a forwarding capability of the forwarding device; and a processor coupled to the receiver and configured to perform, according to the control instruction, a corresponding operation on a service packet of a service according to the encapsulation capability and the forwarding capability of the forwarding device that corresponds to the service information.

18. The forwarding device of claim 17, wherein the forwarding device further comprises a transmitter coupled to the processor and configured to send the network function information to the controller.

19. The forwarding device of claim 18, wherein the forwarding device further comprises a generator coupled to the processor and configured to generate a network function instruction to indicate the network function, and wherein the network function instruction corresponds to one or more network functions, and wherein the transmitter is further configured to send the network function instruction to the controller.

20. The forwarding device of claim 17, wherein the forwarding device comprises a forwarding function, a packet replication function and the forwarding function, or a corresponding encapsulation function and the forwarding function.

\* \* \* \* \*